US012561546B2

(12) United States Patent
Martel et al.

(10) Patent No.: US 12,561,546 B2
(45) Date of Patent: Feb. 24, 2026

(54) ATTACHMENT MECHANISM FOR COUPLING AN ELECTRONIC TAG TO AN ITEM

(71) Applicant: Position Imaging, Inc., Portsmouth, NH (US)

(72) Inventors: Brian Martel, Boulder, CO (US); Peter Schmidt, Fredericksburg, TX (US); Dick Sillman, Los Altos, CA (US)

(73) Assignee: Position Imaging, Inc., Portsmouth, NH (US)

( * ) Notice: Subject to any disclaimer, the term of this patent is extended or adjusted under 35 U.S.C. 154(b) by 0 days.

(21) Appl. No.: 18/438,190

(22) Filed: Feb. 9, 2024

(65) Prior Publication Data

US 2024/0273331 A1     Aug. 15, 2024

Related U.S. Application Data

(60) Provisional application No. 63/444,714, filed on Feb. 10, 2023.

(51) Int. Cl.
*G06K 19/06* (2006.01)
*G06K 19/077* (2006.01)

(52) U.S. Cl.
CPC .............................. *G06K 19/07758* (2013.01)

(58) Field of Classification Search
CPC ......... G06K 19/07758; G06K 7/10396; G06K 19/07749; G06K 19/0701; G06K 19/0723; G06K 19/07762
USPC ........................................... 235/492, 462.46
See application file for complete search history.

(56) References Cited

U.S. PATENT DOCUMENTS

| | | | | |
|---|---|---|---|---|
| 6,307,919 | B1 * | 10/2001 | Yoked ..................... | G06F 3/147 |
| | | | | 235/383 |
| 2002/0010390 | A1 * | 1/2002 | Guice .................... | G16H 50/20 |
| | | | | 600/300 |
| 2006/0170559 | A1 * | 8/2006 | Marsilio ............... | G09F 3/0329 |
| | | | | 340/572.9 |
| 2008/0059133 | A1 * | 3/2008 | Edwards ............. | A61M 15/009 |
| | | | | 703/7 |
| 2016/0183653 | A1 * | 6/2016 | Warther ........... | G06K 19/07726 |
| | | | | 340/10.51 |
| 2019/0209022 | A1 * | 7/2019 | Sobol ...................... | H04W 4/38 |
| 2021/0372167 | A1 * | 12/2021 | Bouan ................. | E05B 73/0041 |
| 2022/0151361 | A1 | 5/2022 | Hill et al. | |
| 2023/0270448 | A1 * | 8/2023 | Herbst ............... | A61B 5/02233 |
| | | | | 606/202 |

* cited by examiner

*Primary Examiner* — Daniel St Cyr
(74) *Attorney, Agent, or Firm* — Schmeiser, Olsen & Watts LLP; Timothy P. Collins, Esq.

(57) ABSTRACT

An electronic tag comprises a body housing a wireless radiofrequency (RF) receiver and a processor that is in communication with the wireless RF receiver. The body has an opening therein. The opening leads to a channel in the body sized to receive a section of a strap or similar mechanical fastener. The body has a latch or similar means for clasping this strap. The latch is coupled to the body to move between a closed position and an open position. An underside of the latch has a tensioning arm attached thereto. The tensioning arm presses against the strap and urging the strap forward into the channel when the latch is moved toward the closed position and disengaging from the strap when the latch is moved into the open position. The latch locks the strap in place when in the closed position.

20 Claims, 32 Drawing Sheets

200

606—

—602

200

412

208

U

1600

208

410

1600

208

303

606

1900

ATTACHMENT MECHANISM FOR COUPLING AN ELECTRONIC TAG TO AN ITEM

RELATED APPLICATIONS

This application claims priority to U.S. provisional application No. 63/444,714, filed Feb. 10, 2023 and entitled "Attachment Mechanism for Coupling an Electronic Tag to an Item," the entirety of which is incorporated by reference herein.

FIELD OF THE INVENTION

The invention relates to systems, methods, and devices for attaching electronic tags to objects for assisting users locate specific products such as suitcases or other baggage.

BACKGROUND

Airline travelers tag their suitcases and other baggage to provide ownership identification, particularly because their luggage is likely mixed with those of other travelers, some of which belongings may be similar in appearance. Many tags are made of paper and have printed or handwritten personal information. Some luggage has transparent compartments for holding a card bearing the personal information. However, the amount of information one can place on such tags is limited to the tag size. Moreover, the information on such tags, such as the address of the owner, may become outdated and consequently inaccurate. Electronic tags with displays are being introduced into the market because of their ability to hold more personal information in addition to ownership identification, such as the ticketing information, and are readily updatable without requiring a replacement. An important consideration of such electronic tags is how they effectively attach to the luggage.

SUMMARY

In one aspect, an electronic tag comprises a strap; a body that houses a wireless radiofrequency (RF) receiver and a processor that is in communication with the wireless RF receiver, the body having an opening, the opening leading to a channel in the body sized to receive a section of the strap; a latch for clasping this strap, the latch coupled to the body to move between a closed position and an open position; and a tensioning arm at an underside of the latch, the tensioning arm pressing against the strap and urging the strap forward into the channel when the latch is moved toward the closed position and disengaging from the strap when the latch is moved into the open position, the latch locking the strap in place when in the closed position.

In another aspect, an attachment device for coupling to an item comprises a body having an opening therein leading to a channel that is sized to receive a section of a strap, the body having a ratchet latch, the ratch latch being coupled to the body to move between a closed position in the channel and an open position, an underside of the latch having a tensioning arm attached thereto, the tensioning arm urging the strap forward into the channel when the latch is moved from the open position toward the closed position and releasing the strap when the latch is moved into the open position.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 8 shows another view of the electronic tag of FIGS. 2-7a.

DETAILED DESCRIPTION

Figure 1:
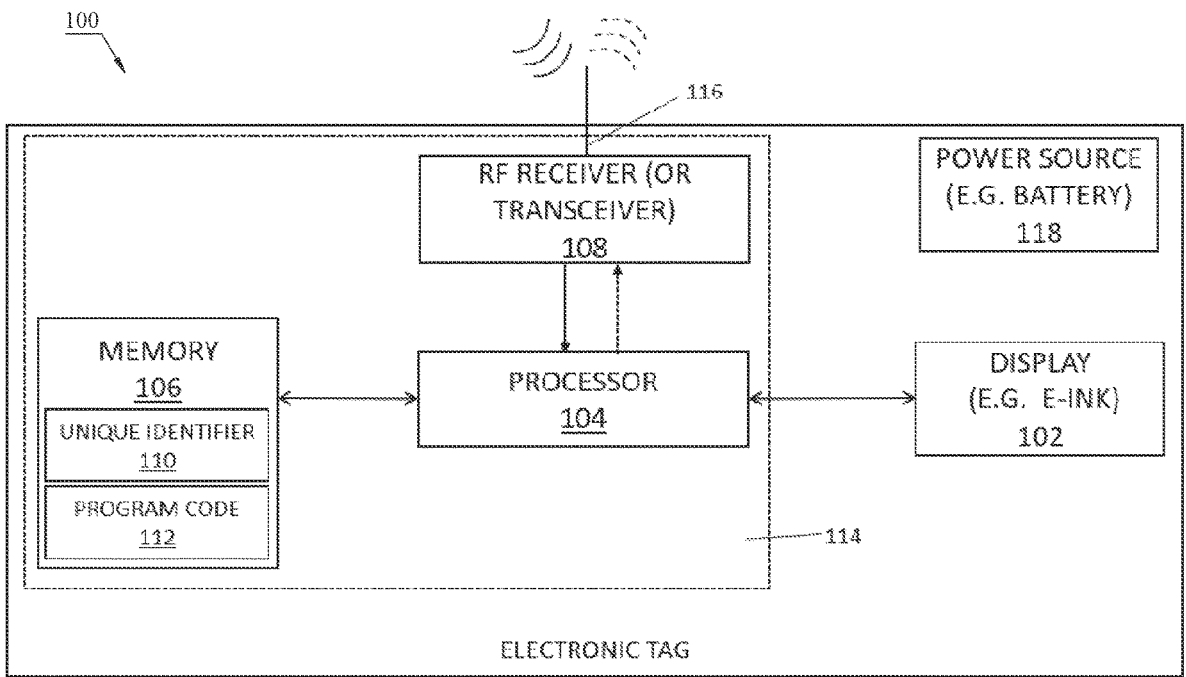
FIG. 1 shows a functional block diagram of an embodiment of an electronic tag with a display.

FIG. 1 shows a functional block diagram of an embodiment of an electronic tag attachment mechanism 100. In one embodiment, the electronic tag attachment mechanism includes an electronic tag constructed as a baggage tag designed to couple to the handle of a piece of luggage. Other embodiments of the electronic tag attachment mechanism 100 includes electronic tag components to facilitate the locating of articles or items of interest within a building of an establishment, business, enterprise, or organization, as described in U.S. patent application Ser. No. 17/588,993, filed Jan. 31, 2022, titled "Article-identification-and-location Device and Systems and Methods of using Same," the entirety of which is incorporated by reference herein.

The display 102 is a variable, dynamic, and programmable screen for presenting an image containing identification information, for example, the name, address, flight information of the owner of the luggage to which the electronic tag attachment mechanism 100 may be coupled. The displayed image may be or include a barcode or QR-code. Embodiments of the display 102 include, but are not limited to, liquid crystal displays (LCD), organic light-emitting diode (OLED) displays, LED displays, and electronic paper (i.e., electronic ink or e-ink) and bi-stable displays. In e-ink and bistable embodiments, the display 102 does not need power to maintain the image and retains the displayed content after the power to the display is turned off. Such display screens 102 continue to display the information on the screen after power to the display is off. Other embodiments of the electronic tag attachment mechanism 100 may not have an electronic display, without departing from the principles described herein. Therefore, the display 102 shown in FIG. 1 is not present in these other embodiments.

The electronic tag attachment mechanism 100 includes a processor or processing unit 104, memory 106, an RF receiver 108 (or, in another embodiment, an RF transceiver). The memory 106 stores a unique identifier 110 and program code 112, which, when executed, changes the information displayed on screen of the display 102. The unique identifier can be associated with the tag attachment mechanism 100 and/or with user information about a user of the tag. For example, in embodiments where the tag attachment mechanism 100 is a luggage tag, the identifier can include information regarding a pointer or the like to a data storage of such information about a user of the luggage tag. The memory 106 and the information and program code it stores can be physically distributed among the various components of the tag 102. For example, the RF receiver (or RF transceiver) can store the unique identifier, and the processor 104 can have the memory that stores the program code 112.

The processor 104 and memory 106 may be part of a single chip 114. The RF receiver 108 is electrically connected to an antenna 116; the RF receiver 108 and antenna 116 may also be part of the single chip 114. In some embodiments, the electronic tag attachment mechanism 100 further includes a battery 118 for providing power to the various components of the tag attachment mechanism 100, although another embodiment may be battery-less.

In addition, some embodiments of the tag attachment mechanism 100 may include one or more indicators (not shown), for example, an LED and/or a speaker or buzzer, and one or more sensors (not shown), for example, an altimeter, an inertial sensor (e.g., accelerometer, magnetometer, gyroscope), a pressure sensor, a contact sensor, an angular Hall sensor, a temperature sensor, a humidity sensor, a sensor with capacitive sensing ability, and/or other sensors for detecting environmental conditions to which the sensor is exposed, or any combination thereof.

The RF receiver 108 operates in accordance with a wireless communication technology, examples of which include, but are not limited to Bluetooth®, Bluetooth Low Energy (BLE), 802.XX, WLAN and ultra-wideband (UWB), and may be part of an RF transceiver.

In one embodiment, the RF receiver 108 includes radio frequency (RF) circuitry adapted to capture energy from a radiofrequency signal, for example, from a near-field communication (NFC) transfer with an external NFC reader (e.g., a smartphone executing an appropriate app or a separate RF NFC reader). In general, NFC is a short-range wireless connectivity technology that lets NFC-enabled devices communicate with each other. Near-field communication transmits data and power through electromagnetic radio fields. To work, the communicating devices contain NFC-enabling circuitry or chips. Communications occur within a short distance with NFC-enabled devices either physically touching or within a few centimeters of each other for data and power transfer to occur.

Alternatively, or in addition to the RF receiver 108, the processing unit 104 may include the NFC-enabling circuitry. The NFC-enabling circuitry achieves a power transfer and a data transfer from the NFC reader. The transferred power may be sufficient to refresh and update the display screen 102. The transferred data serves to determine the image on the display. After the power is turned off (e.g., the NFC transfer ceases because the NFC reader is removed or battery power is disconnected from the display), the updated image remains on the display screen (i.e., for e-ink and bi-stable displays).

The processor or processing unit 104 is electronic circuitry adapted to execute the instructions of the program code 112 that controls the programming of the display 102, for example, the processing of RF signals received by the RF receiver 108 to retrieve therefrom a unique identifier, the comparing of the received unique identifier with the unique identifier 110 stored in the memory 106, and the programming of the display 102 with the transferred data when such unique identifiers match. If so configured, the processor 104 may activate one or more indicators in response to the match.

The battery 118 may be unremovable or removable, wired or wirelessly rechargeable (whether unremovable or removable), replaceable (whether non-rechargeable or rechargeable), or neither replaceable nor rechargeable, in which instance the electronic tag attachment mechanism 100 is disposable after the battery has discharged. In one embodiment, the tag attachment mechanism 100 may operate predominantly in sleep mode to extend the battery life, on a duty cycle for receiving and transmitting (when so configured), awakening periodically to listen for the unique identifier that causes the tag attachment mechanism 100 to perform an action and to transmit its unique identifier (also, when so configured). Other techniques may be used to minimize battery consumption.

Figure 2:
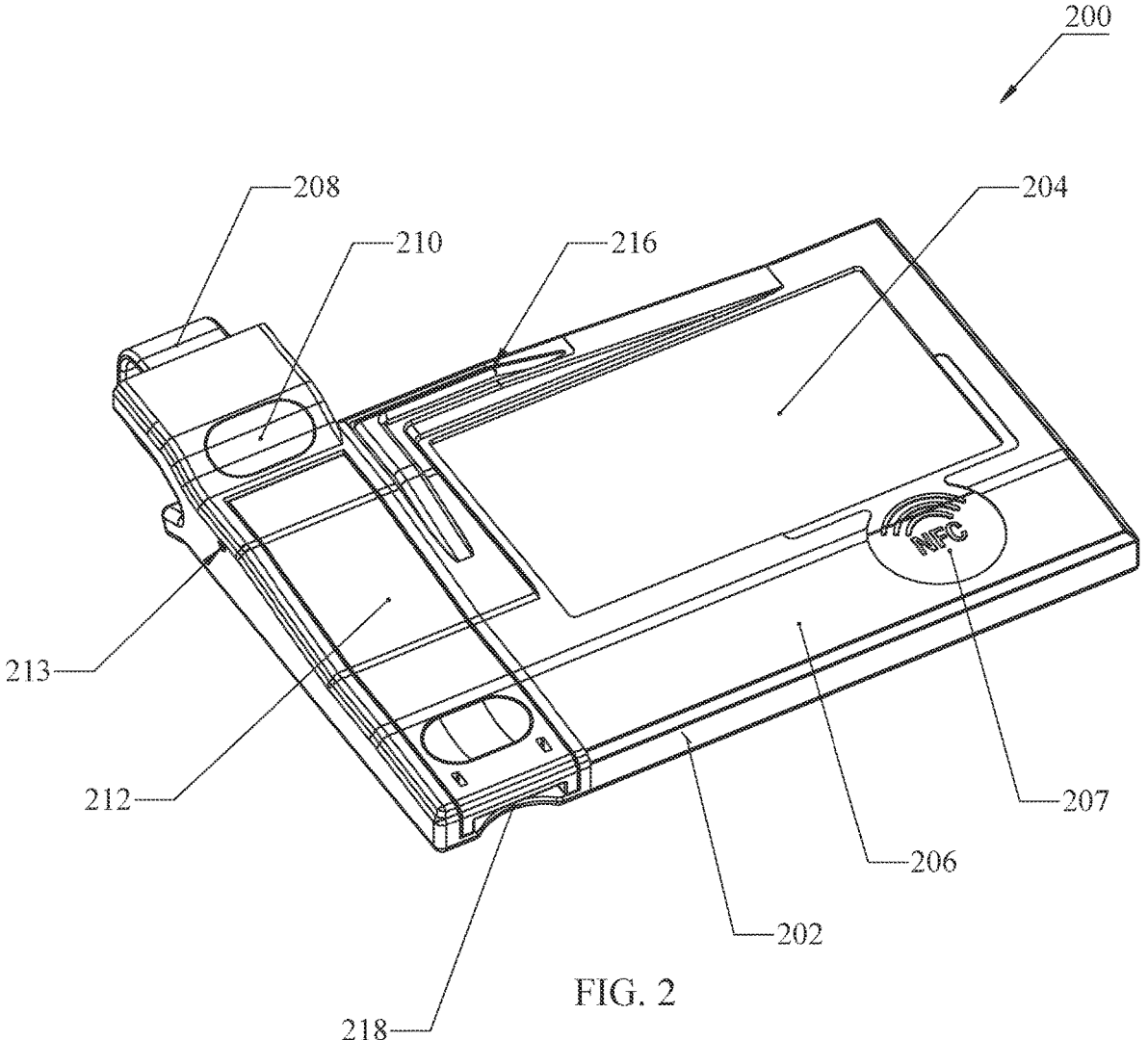
FIGS. 2-4 show perspective views of an embodiment of an electronic tag, in accordance with some embodiments.

FIG. 2 shows an embodiment of the electronic tag 200 of FIG. 1 including a tag body 202 with a display 204 integrated into a top surface 206 of the body and a fastening strap 208 coupled to the body. Although a strap is shown and described herein, other mechanical fasteners may equally apply. On the top surface 206 is an NFC locator symbol 207, to guide where to place an external NFC reader, for example, a smartphone, when executing an NFC transfer communication.

The fastening strap 208 is coupled to the tag body 202 at a strap installation stop 210, disposed near a ratchet latch 212, which is here shown in the closed position. The ratchet latch 212 is movably coupled to the tag body at a pivot 213. The fastening strap 208 folds under itself and enters the body 202 to form a loop 214 (shown in clearer detail in FIG. 6). When the tag 200 is in use, this loop 214 may wrap around a luggage handle, holding the display 204 to face outwards while keeping the tag from rotating on the handle. After the free end of the fastening strap is in the tag body 202, partially opening and closing the ratchet latch 212 draws the fastening strap 208 forward into the tag body 202, as described in more detail in connection with FIG. 3 and FIG. 4. Fully closing the ratchet latch 212 locks the strap in place. A ratchet latch release notch 218 lies below the closed ratchet latch 212, it's curvature making room for a user's finger to get below a front end of the latch 212 for the purpose of raising and thus unlocking the latch.

Within the tag body 202 are one or more printed circuit boards with the various components described in connection with FIG. 1. A raised edge 216 at one corner of the display 204 may help protect the display 204 during the handling of the object to which the tag is attached. The tag 200 can be attached to any object or item, such as a package, parcel, musical instrument, shelving, ground or aerial vehicle, or any luggage, suitcase, briefcase, satchel, or attaché case. In one embodiment, the tag body 202 is about 140 mm long (depending on the fastening strap's width) and approximately 84 mm wide at the display (or approximately 105 mm wide at the latch 212), and the length of the fastening strap is approximately 195 mm. The thickness of the tag body of this embodiment is approximately 9 mm at the display and thicker (approximately 17.5 mm) at the ratchet latch 212. Preferably, the length of the fastening strap 208 is such that it does not stick out of the opposite side of the tag body 202 after the ratchet latch 212 is closed. In an alternative embodiment, the ratchet latch 212 can be disposed alongside, instead of at one end, of the display 204 (i.e., turned 90 degrees from the alignment shown).

Figure 3:
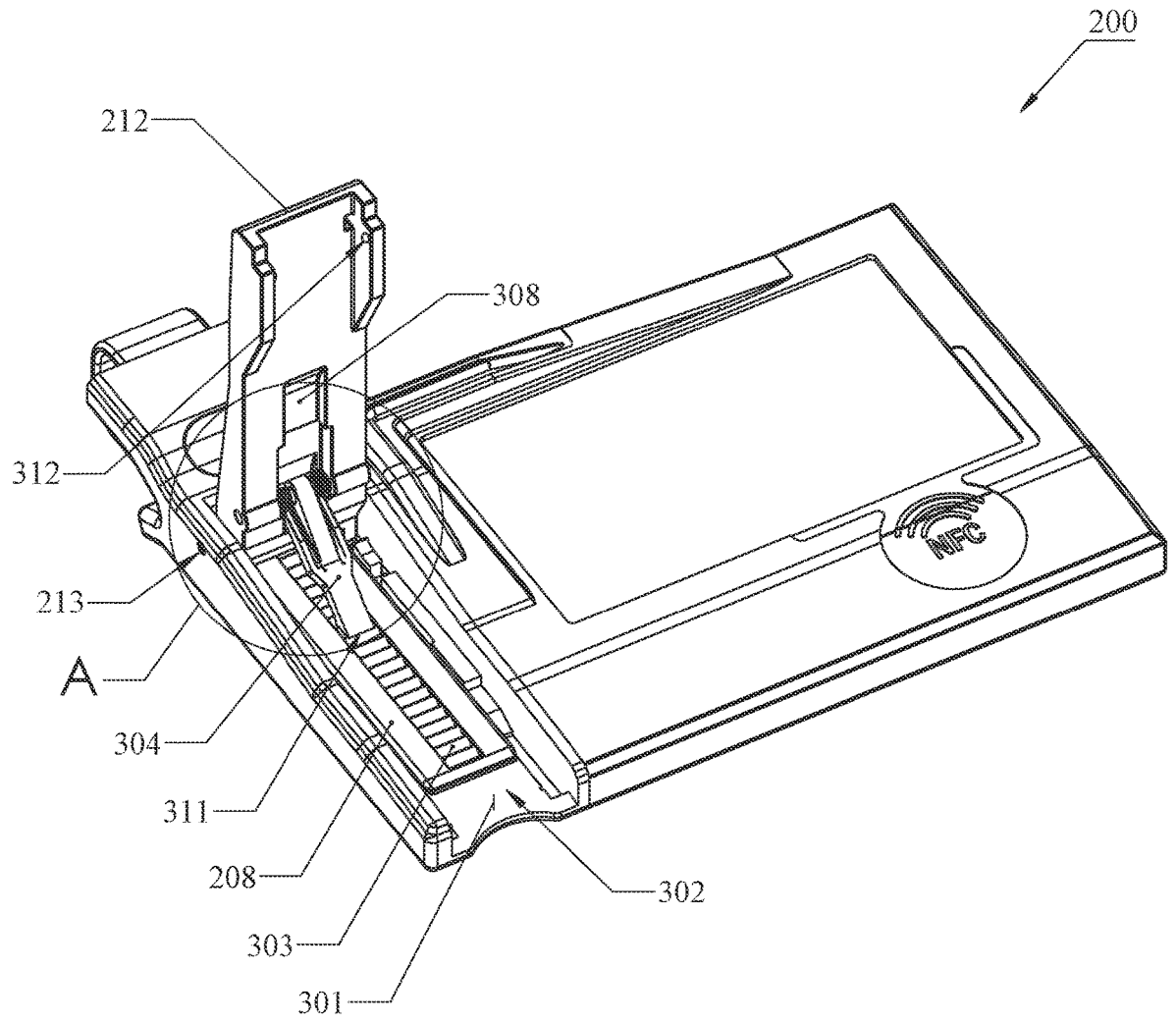

FIG. 3 shows the tag 200 with the ratchet latch 212 in an open position at one end of a channel 302 that passes through the width of the tag body 202. The fastening strap 208 extends through this channel 302 atop the channel's base surface 301. In some embodiments, the strap 208 has elasticity characteristics and can therefore stretch through the channel is an elastic state. In other embodiments, the strap 208 is inelastic and not stretchable. A continuous series of strap ratcheting notches 303, or grooves, slots, or the like, traverse the center of the strap 208. The ratchet latch 212 rotates on the pivot 213 (FIG. 2). A tensioning arm 304 is rotatably coupled at a pivot 306 on an underside of the ratchet latch 212. The ratchet latch 212 has an indent 308 to receive the tensioning arm 304 when the ratchet latch is fully closed (the tensioning arm 304 folding into the indent 308 as the latch closes). A pair of springs 310 about the pivot 306 urge the tensioning arm 304 away from the ratchet latch 212 as the latch is opened (a single spring may be used for this purpose). The underside of the ratchet latch 212 includes a pair of ratchet latch detents 312 and a pair of catch release arms 314, the functions of which are described in greater detail below.

Figure 6A:
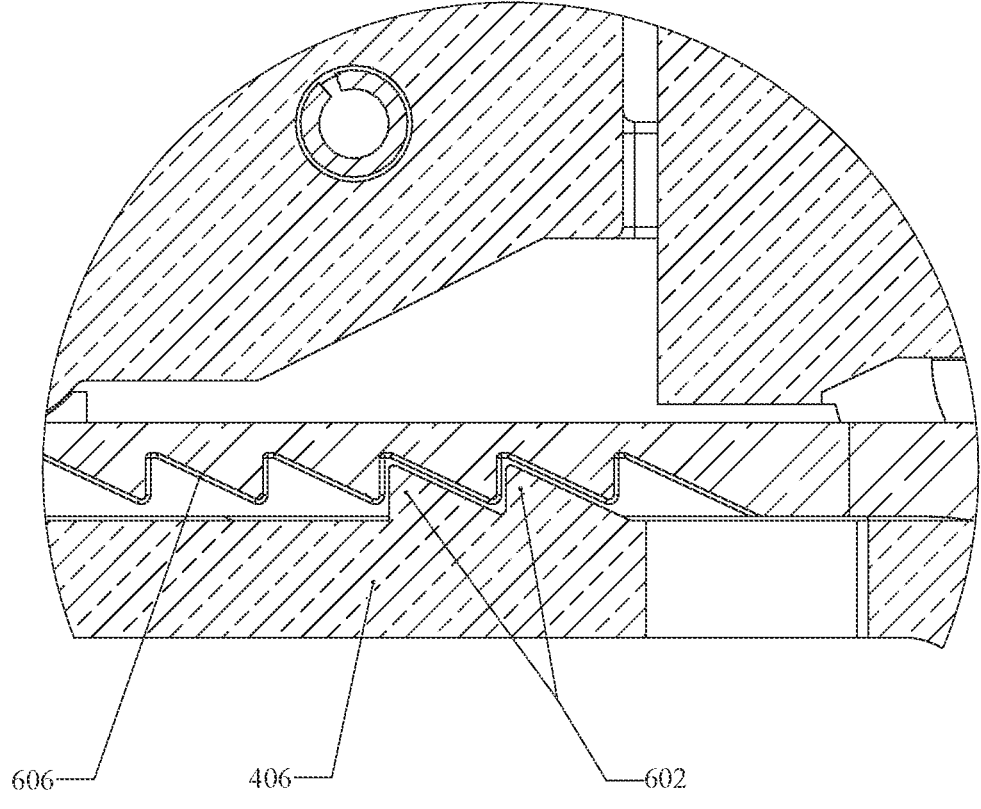
Figure 7:
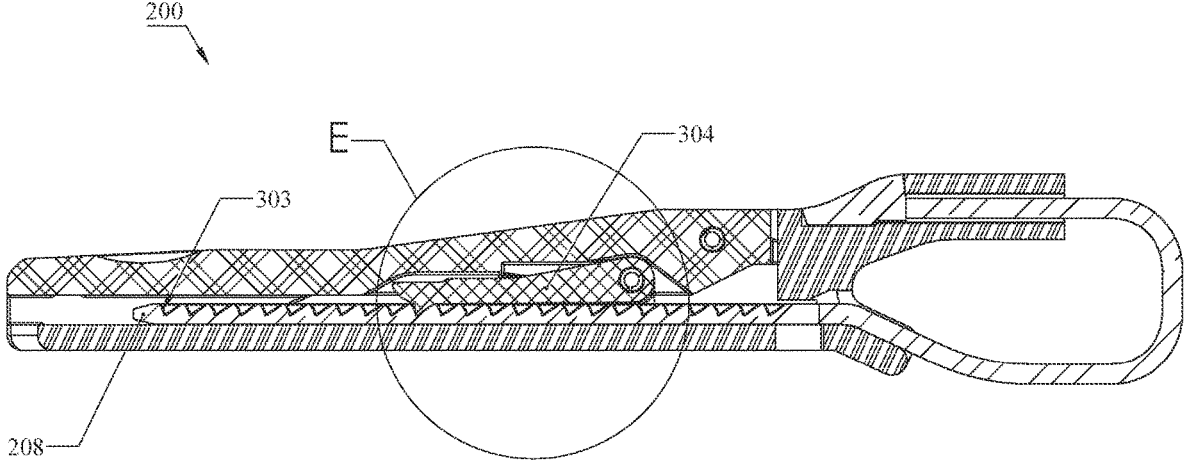

In the open latch position shown in FIG. 3, an end 311 of the tensioning arm 304 maintains the tensioning arm 304 in a state, e.g., applies a force to keep the tensioning arm down by hitting the latch to prevent upward movement when the latch is closed, shown in detail in FIG. 7. Alternatively, a series of evenly space through slots may be used without departing from the principles described herein.) In this position, the fastening strap 208 is stretched and under tension. If, from this open position, the ratchet latch 212 is rotated towards the closed position, the tensioning arm 304 urges the strap 208 forward (or farther) into the channel 302. The tensioning arm 304 continues to restrain the strap, which is now in a more forward location within the channel 302. Concurrently, each catch release tooth (e.g., tooth 602 shown in FIG. 6a) rising from the cantilevered base 406 (see FIG. 4 where at least one catch release tooth is on each side of the base surface also shown in FIG. 20a) enters a notch on the opposite side of the fastening strap 208 to hold the forward progress of the strap (as the strap is being tightened). When the latch 212 is subsequently pulled open, the tensioning arm 304 moves rearward over the notches 303 until a subsequent lowering of the latch 212 moves the tensioning arm 304 forward again.

The ratchet latch 212 thus acts like a ratchet strap: by opening the latch 212 to a 90-degree open position (as shown in FIG. 3) and lowering the latch (without fully closing and locking it), the user can stretch and tighten the fastening strap, using the mechanical advantage of the latch.

Figure 3A:
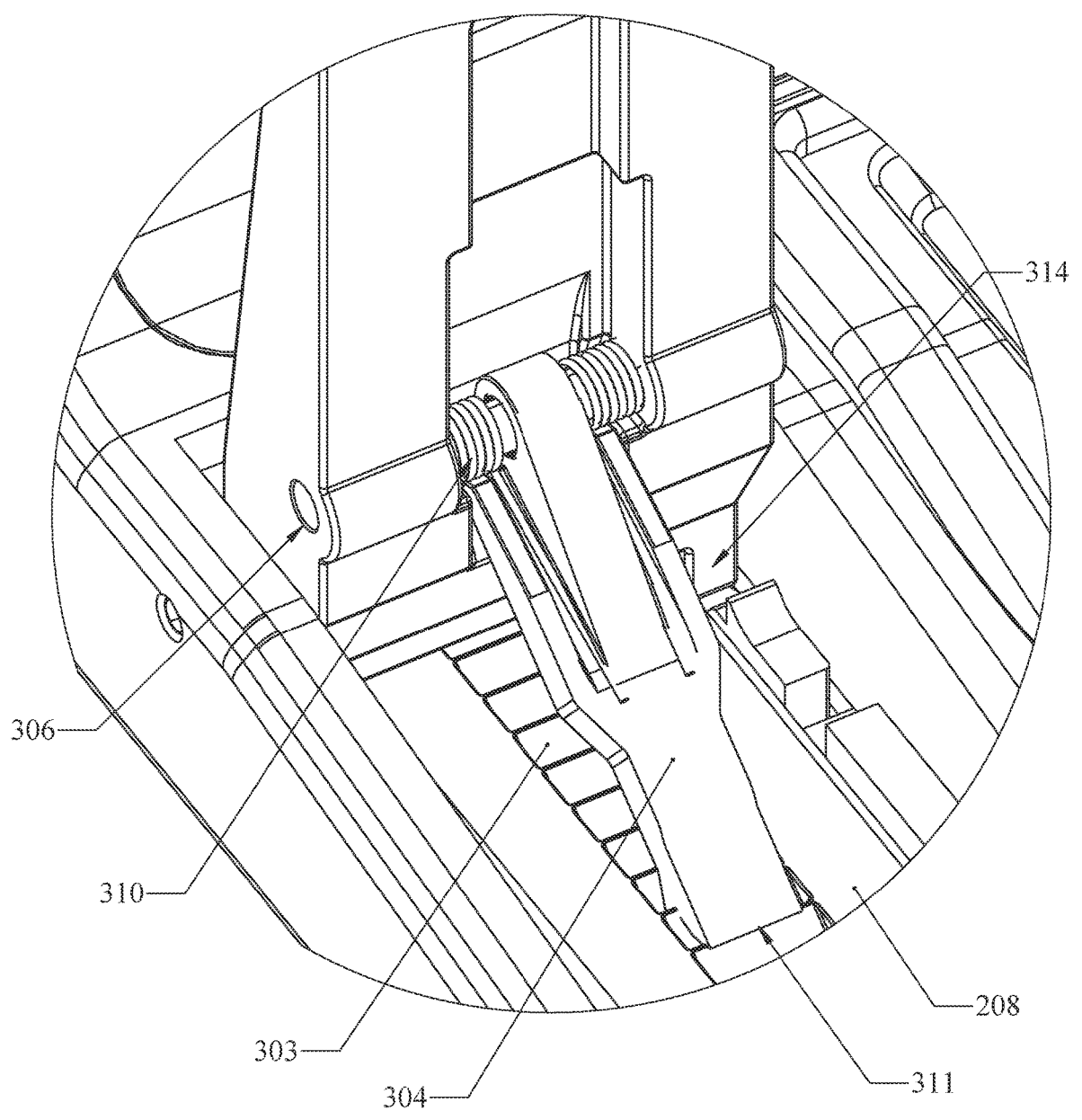

Releasing each catch release tooth from the strap 208, so that the free end of the fastening strap may be pulled completely out of the tag body 202 (with the anchored end remaining secured to the tag body at the installation stop), entails a deflection of the cantilevered base 406 (FIG. 4) (from which each catch release tooth rises) away from the strap. In one embodiment, this base surface 301 is cantilevered (in the region where the catch release teeth are disposed), as shown in connection with FIG. 4. When the latch is rotated into an open position that exceeds ninety degrees (referred to as a release position), the two catch release arms 314 of the latch (one on each side of the latch) deflect the cantilevered base downward to move each catch release tooth out of a notch on the underside of the strap. This is illustrated in greater detail in FIG. 9a. While in the release position, the latch raises the tensioning arm 304 enough distance to disengage the tensioning arm's end 311 from the fastening strap 208. FIG. 3A corresponds to the encircled detail A in FIG. 3, wherein the latch 212 is in an open position (but not opened far enough to be in the release position), showing the tensioning arm 304, the springs 310, and the catch release arm 314.

Figure 4:
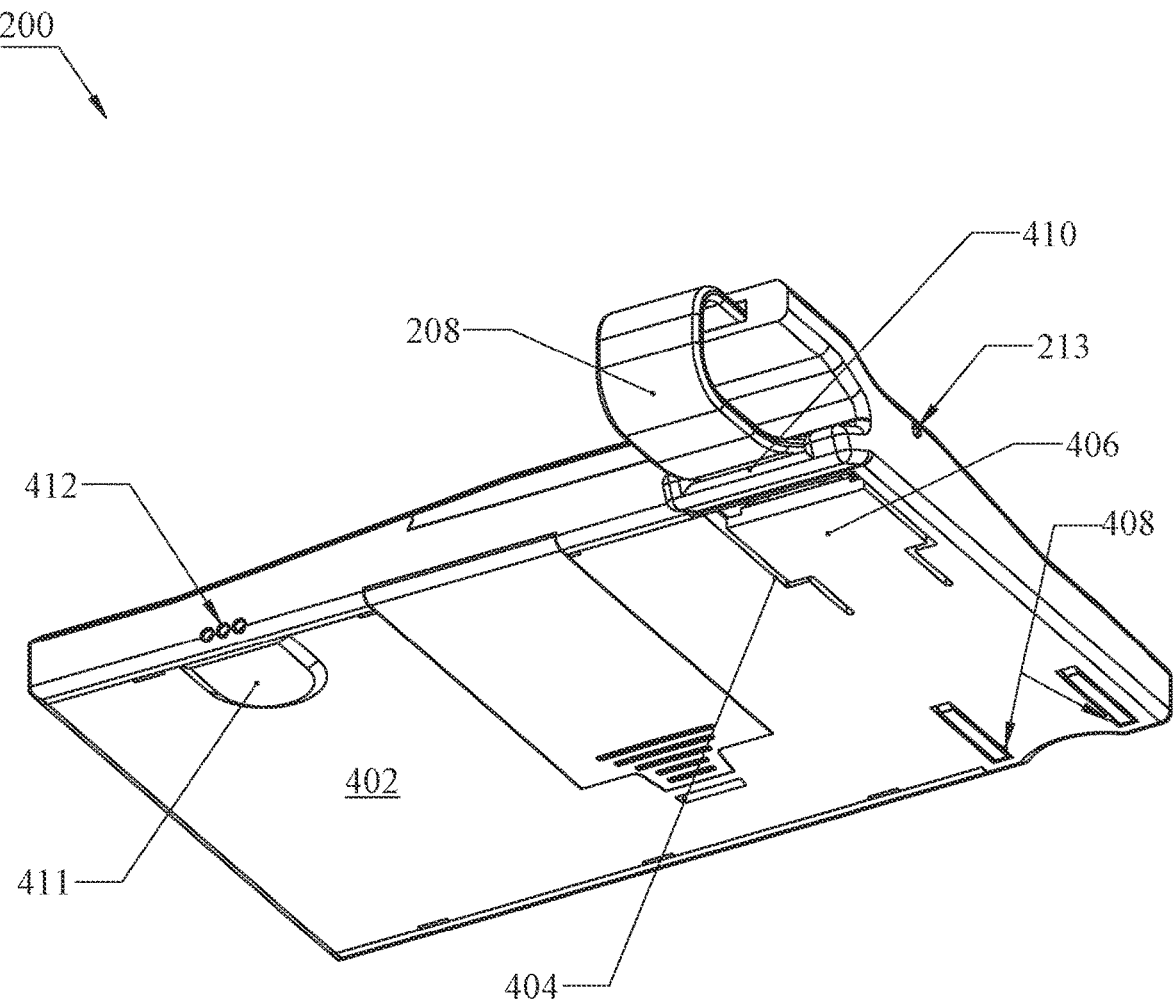

FIG. 4 shows a bottom surface 402 of the tag 200, which includes a t-shaped cut-through 404 that provides the aforementioned cantilevered base surface 301 (hereafter referred to as a cantilevered base 406). The bottom surface 402 also includes detent slots 408 therein, which receive the detents 312 (FIG. 3) of the latch when the latch is fully closed. Also shown is an opening 410 into the channel 302 that passes through the tag body 202 shown in FIG. 3. In some embodiments, the tag 200 include other locking mechanisms, for example, one or more hooks, a mechanism requiring the user to slide a catch over the end of the latch once closed, or a spring loaded pin, operating in a similar as a watch band attaching to the watch body. In some embodiments, the bottom surface 402 of the tag 200 includes a locally thickened base 411 to allow room for a buzzer chamber or other audio emitting element under the printed circuit board (PCB) of the tag 200. In some embodiments, the tag 200 includes three sound ports to an audio-generating device such as a buzzer inside the tag body to emit a sound in the audible range of humans, which can aid users in locating the tag 200. The buzzer can be optimized to produce a sound in the optimal frequency for human hearing. Other features of the tag 200 may include a flashlight lens or the like, which an aid users visually in locating the tag 200.

Figure 5:
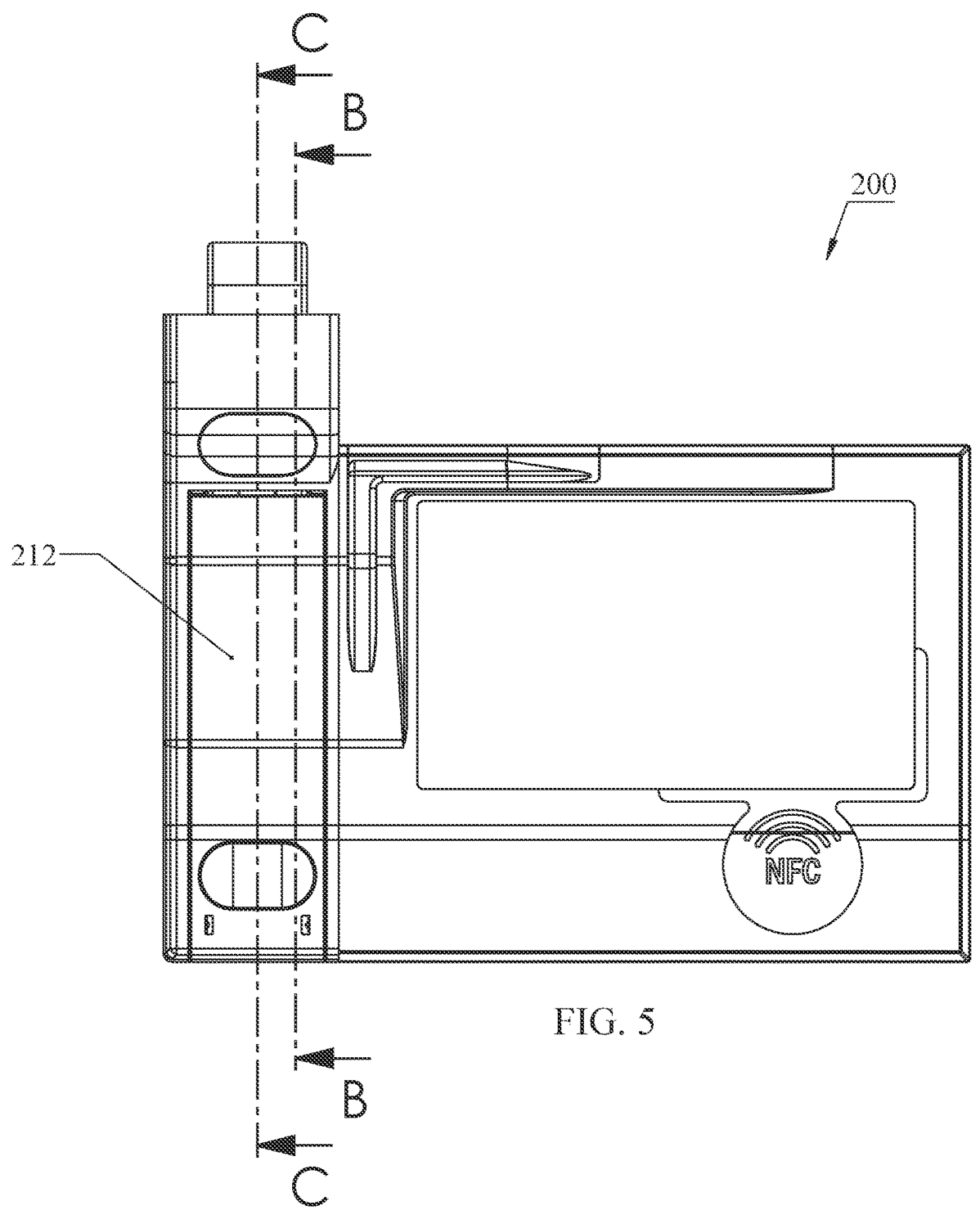
FIG. 5 shows a front view of the electronic tag of FIGS. 2-4.

FIG. 5 is a top view of the tag 200 with two cross-section lines B-B and C-C, both of which pass through the ratchet latch 212, which is in the closed position. Cross-section B-B is off-center, and cross-section C-C bisects the latch 212.

Figure 6:
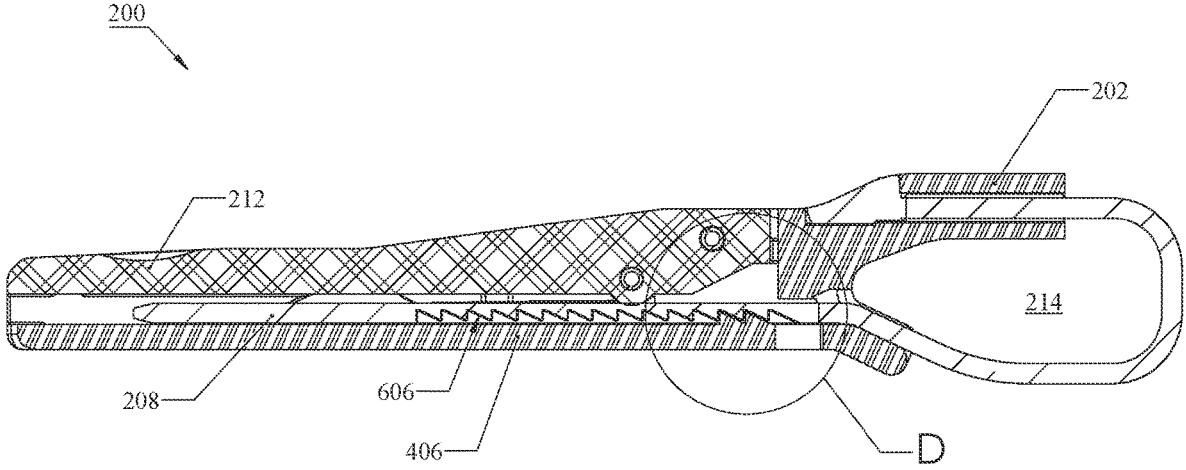
FIGS. 6-7a show various section views of the electronic tag of FIGS. 2-5.

FIG. 6 shows the cross-section B-B of FIG. 5, and FIG. 6A shows the encircled detail D of FIG. 6. In FIGS. 6 and 6A, the cantilevered base 406 has the catch release tooth 602 rising from its interior base surface 301 shown in FIG. 3. Here, the latch 212 is in the closed position, and the catch release tooth 602 is disposed in one of the notches 606 on the underside of the fastening strap 208. In some embodiments, more than one tooth 602 can be disposed in a notch 606, but not limited thereto, for example, in configurations where there are two or more catch release teeth 602 per side of the base 406.

In one embodiment, the notches 606 are continuous and each one has the vertical side and a sloped side. The vertical side of each notch 606 faces rearward, and when the catch release tooth 602 enters a notch 606, the vertical side of the catch release tooth 602 abuts the vertical side of that notch; the catch release tooth 602 thus restricts backward movement of the strap 208 while the latch 212 is open (but not in the release position). In some embodiments, the strap 208 may include a protrusion, ball, or bump (not shown) extending from the top and/or bottom surface of the strap 208, which can mate with an indentation, groove, or the like in a channel of the tag body 202 where a portion of the strap 202 is inserted. This mating configuration, or bump retaining feature, provides an additional secure coupling of the strap 208 inside the body 202 When the strap 208 is attached to the body 202, the bump on the strap 208 is pulled into a correspondingly sized region at the installation stop 210 and snaps into place, securing the strap to the tag body 202.

Figure 7A:
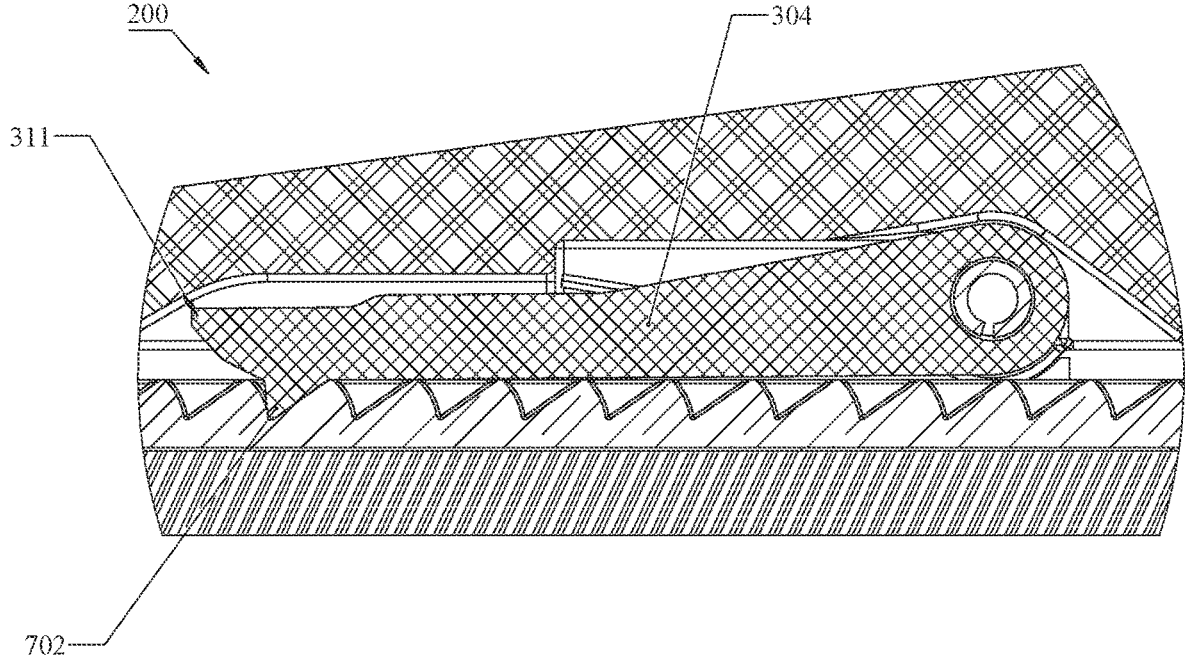

FIG. 7 shows the cross-section C-C of FIG. 5. This cross-section shows the tensioning arm 304 with a tooth 702 at its end 311. The latch 212 is in the closed position, and the tooth 702 is disposed in one of the notches 303 on the topside of the fastening strap 208. FIG. 7A shows the encircled detail E in FIG. 7, wherein the tooth 702 of the tensioning arm 304 is disposed within one notch 303 on the topside of the strap 208. When the ratchet latch 212 is in its fully closed position with the tensioning arm 304 at its most forward position (as shown in FIG. 7A), the distance between the tensioning arm tooth 702 and the catch release tooth 602 is a multiple of the spacing or pitch of the strap ratcheting notches 303 and the strap catch notches 606. This ensures the catch release tooth 602 is always in position to capture the forward progress of the strap 208.

Figure 8:
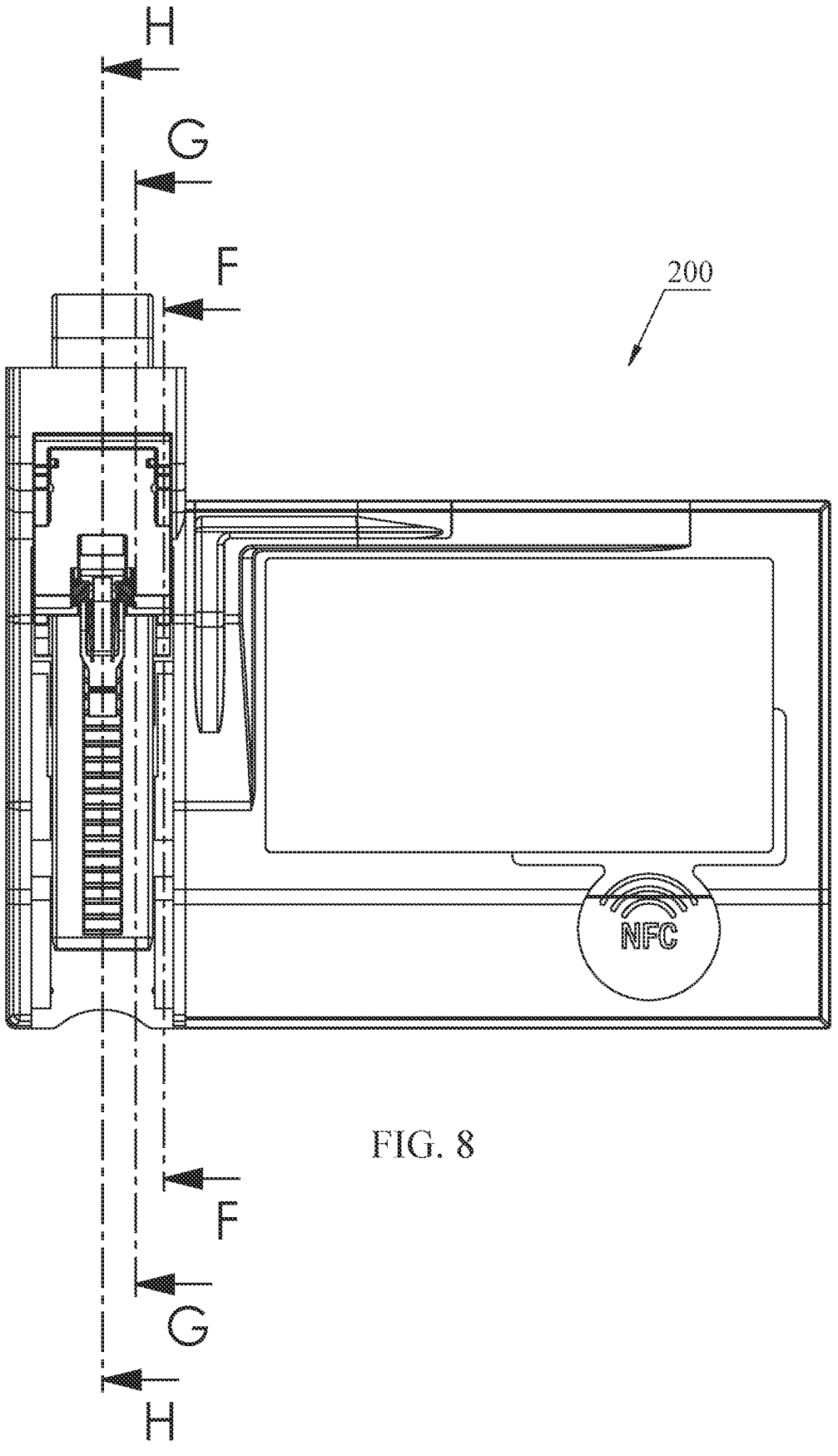

FIG. 8 is a top view of the tag 200 with three cross-section lines F-F, G-G, and H-H, each of which passes through the ratchet latch 212, which is in the release position. Cross-section F-F is at an edge of the latch, cross-section G-G is off-center (similar to cross-section B-B of FIG. 5), and cross-section H-H bisects the latch 212 (similar to cross-section C-C of FIG. 5).

Figure 9:
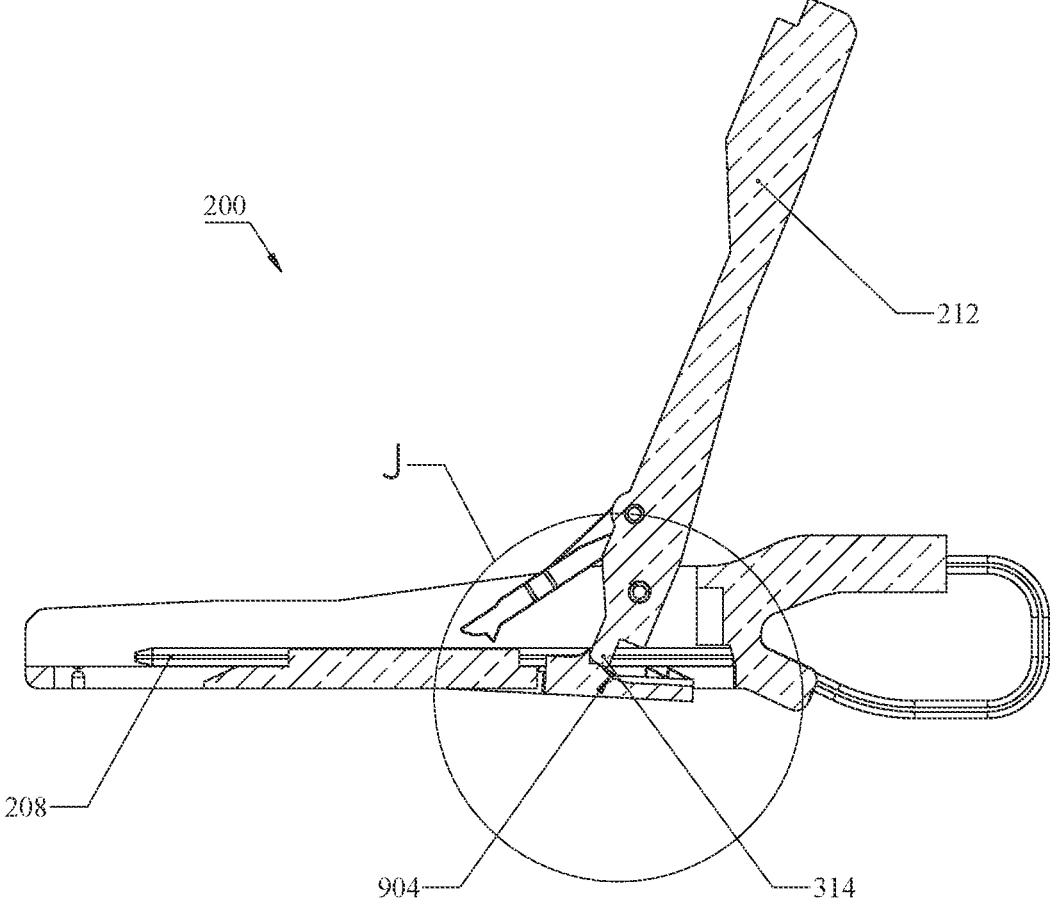
FIGS. 9-11a show various section views of the electronic tag of FIGS. 2-8.
Figure 9A:
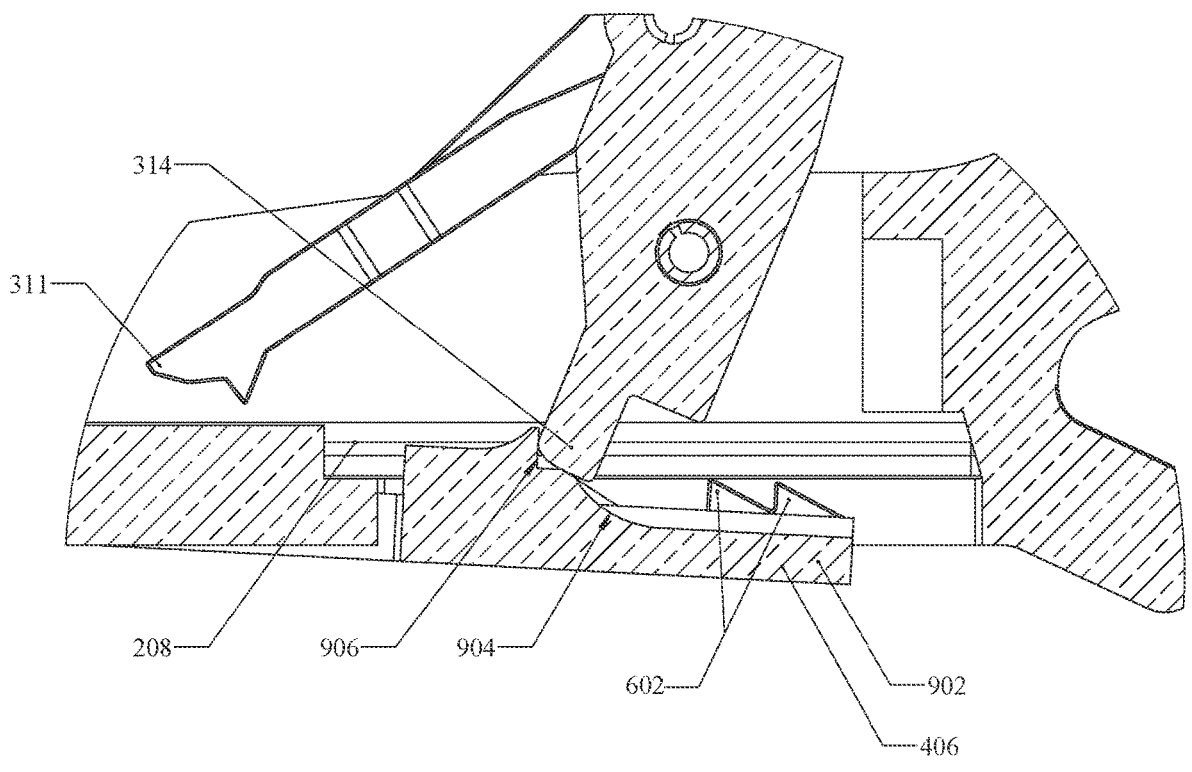

FIG. 9 shows the cross-section F-F of FIG. 8. The latch 212 is in the release position, that is, the angle with respect to the cantilevered base 406 (undeflected) is greater than ninety degrees. As the latch 212 is moved into the release position, the catch release arm 314 swings (rotates) up a catch release ramp 904 of a catch release beam 902 and comes into contact with a catch release arm stop 906. This latch movement and contact puts a downward pressure upon the catch release beam 902, which is part of the cantilevered base 406. In response to this downward urging, the cantilevered base 406, and the catch release beam 902 with it, deflects downwards in response to the urging of the catch release arms 314 against the raised catch release ramp 904. FIG. 9A shows the encircled detail J in FIG. 9, wherein the catch release arm 314 has risen up the catch release ramp 904 and is stopped at the catch release arm stop 906.

Figure 10:
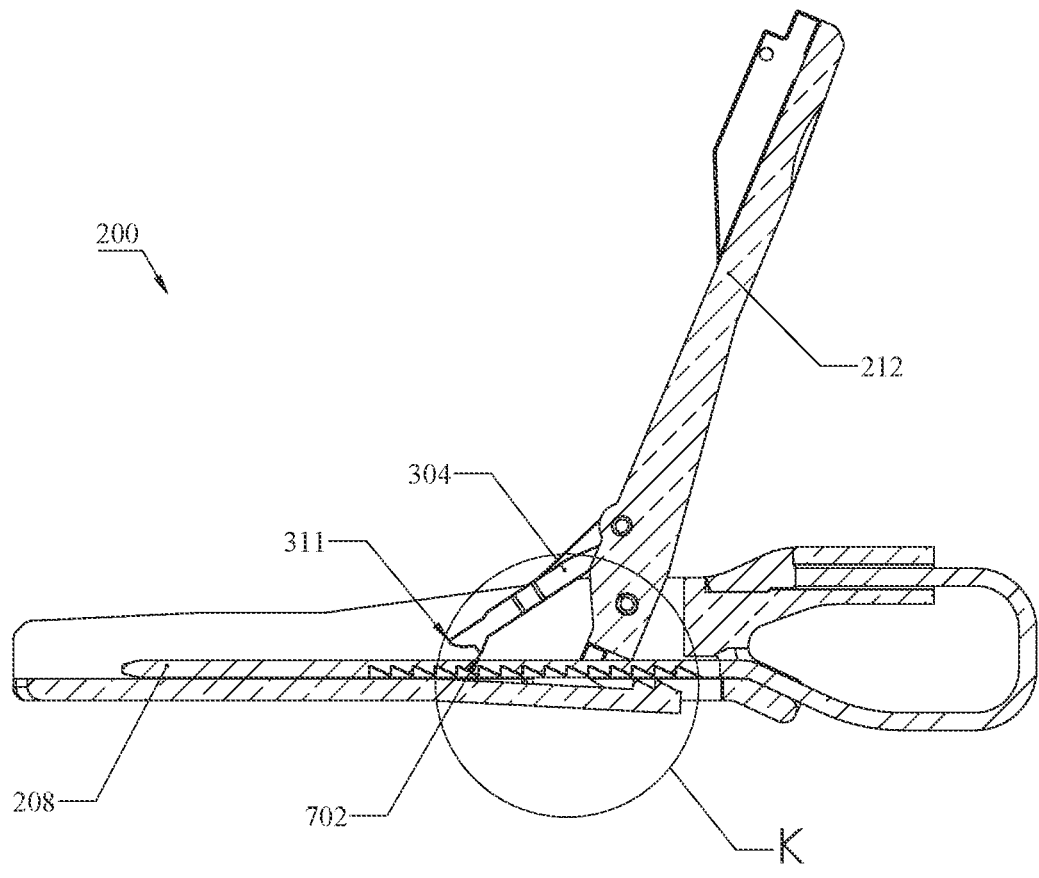

FIG. 10 shows the cross-section G-G of FIG. 8. This cross-section shows the downward deflection of the catch release tooth 602 resulting from the deflection of the cantilevered base 406. This deflection causes the catch release tooth 602 to disengage from the notches 606 on the underside of the fastening strap 208. Although a single catch release tooth 602 is shown, these features may apply to multiple teeth.

Figure 10A:
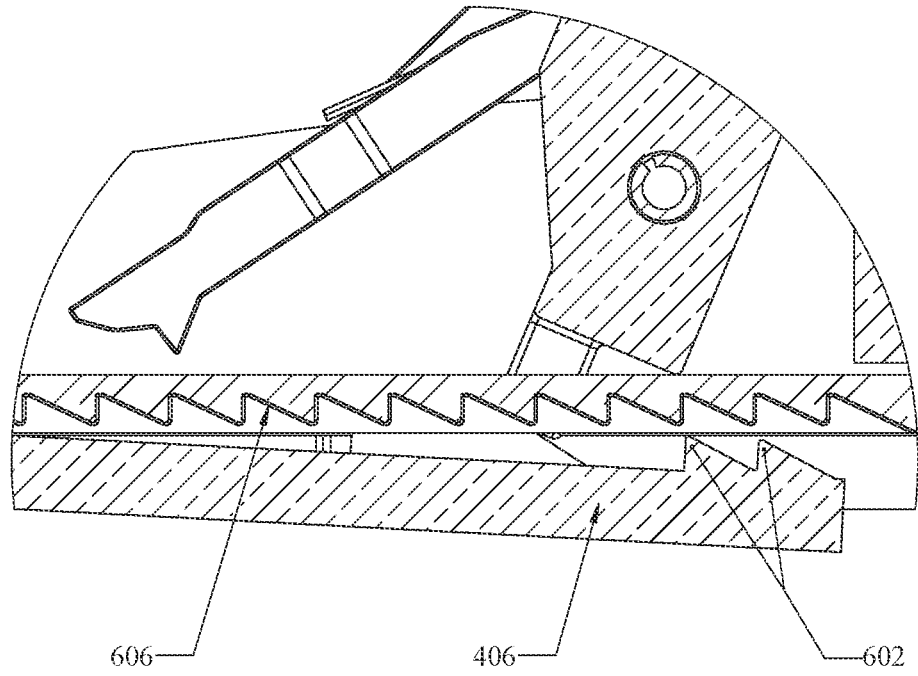

FIG. 10A shows the encircled detail K in FIG. 10, wherein the catch release tooth 602 has been deflected downward out of an underside strap notch 606 in response to the downward deflection of the cantilevered base 406 described in connection with FIG. 9.

Figure 11:
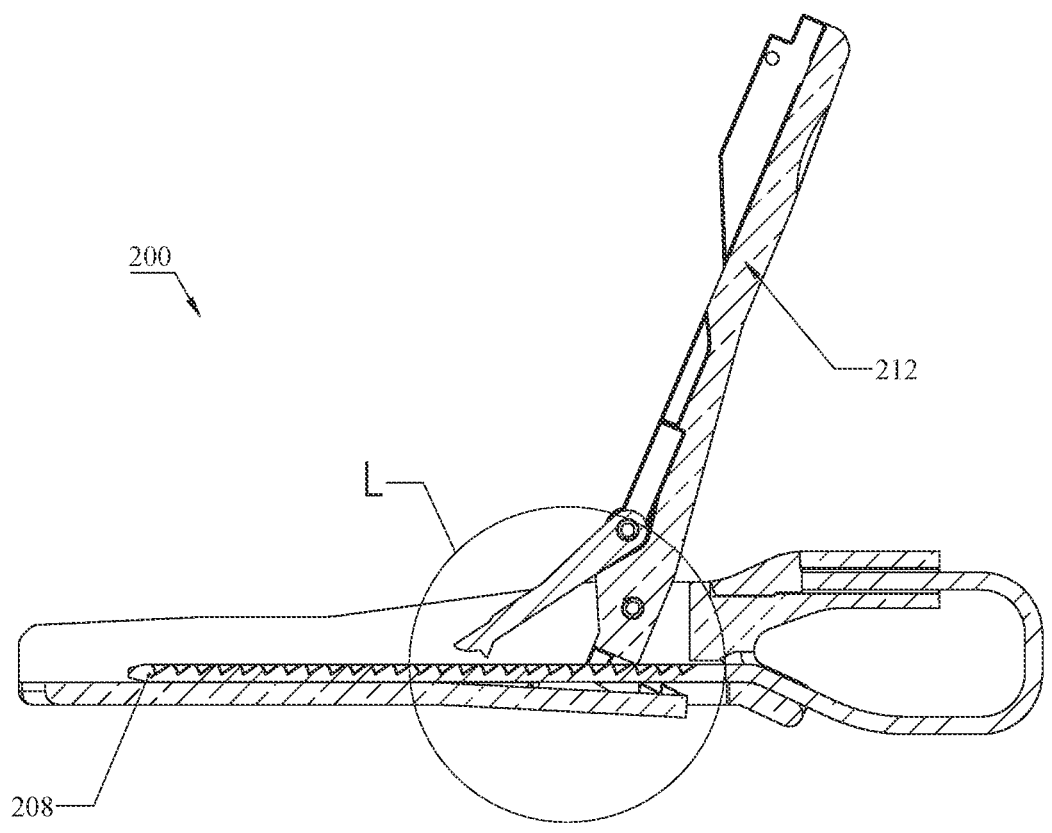

FIG. 11 shows the cross-section H-H of FIG. 8. This cross-section shows the effect of moving the latch 212 into the release position on the tensioning arm 304. As the latch 212 is opened, the tensioning arm 304 is drawn away from the channel 302. When the latch 212 reaches the release position, the tooth 702 at the end 311 of the tensioning arm 304 is disengaged from the notches 303 on the topside of the strap 208. With both the catch release tooth 602 and the tooth 702 of the tensioning arm 304 disengaged from the notches on both the underside and topside of the strap 208, the free end of the strap can be pulled manually out of the tag body.

Figure 11A:
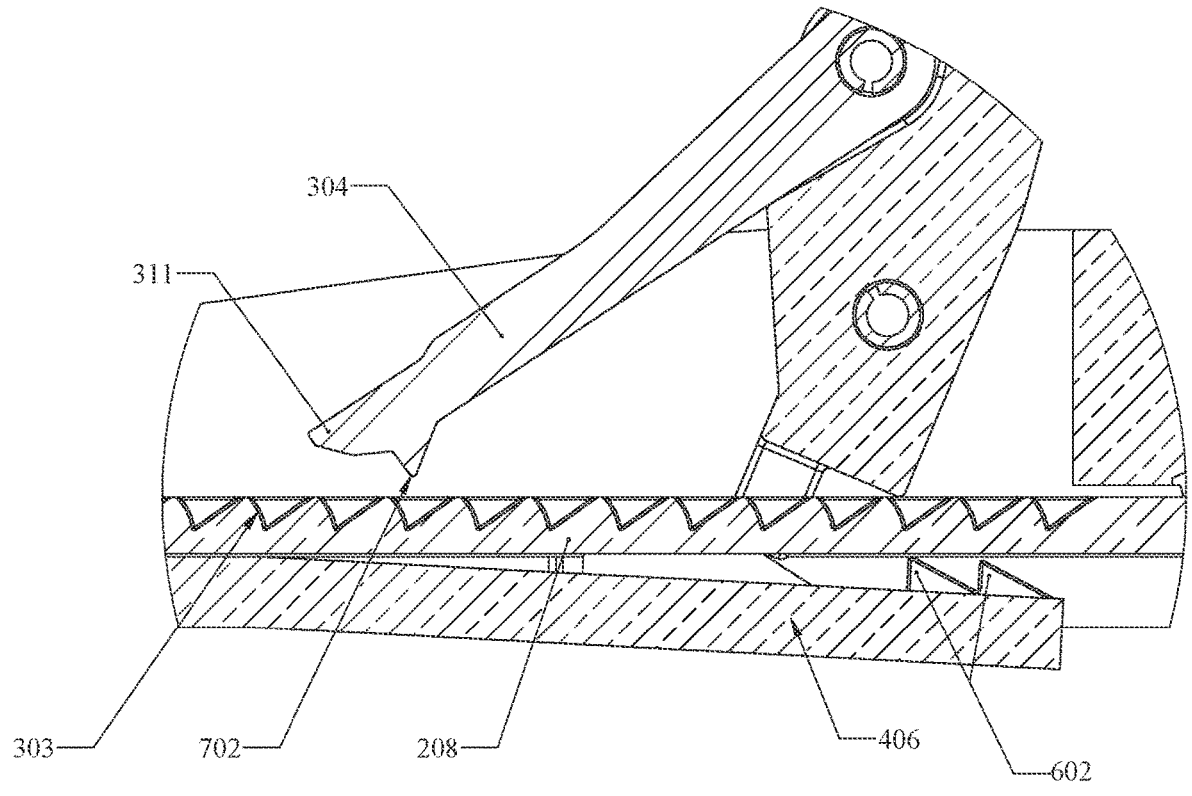

FIG. 11A shows the encircled detail L in FIG. 11, wherein the tooth 702 at the end 311 of the tensioning arm 304 is disengaged from a notch 303 on the topside of the strap 208 and the catch release tooth 602 has been deflected downward out of an underside strap notch 606 in response to the downward deflection of the cantilevered base 406 described in connection with FIG. 9.

Figure 12:
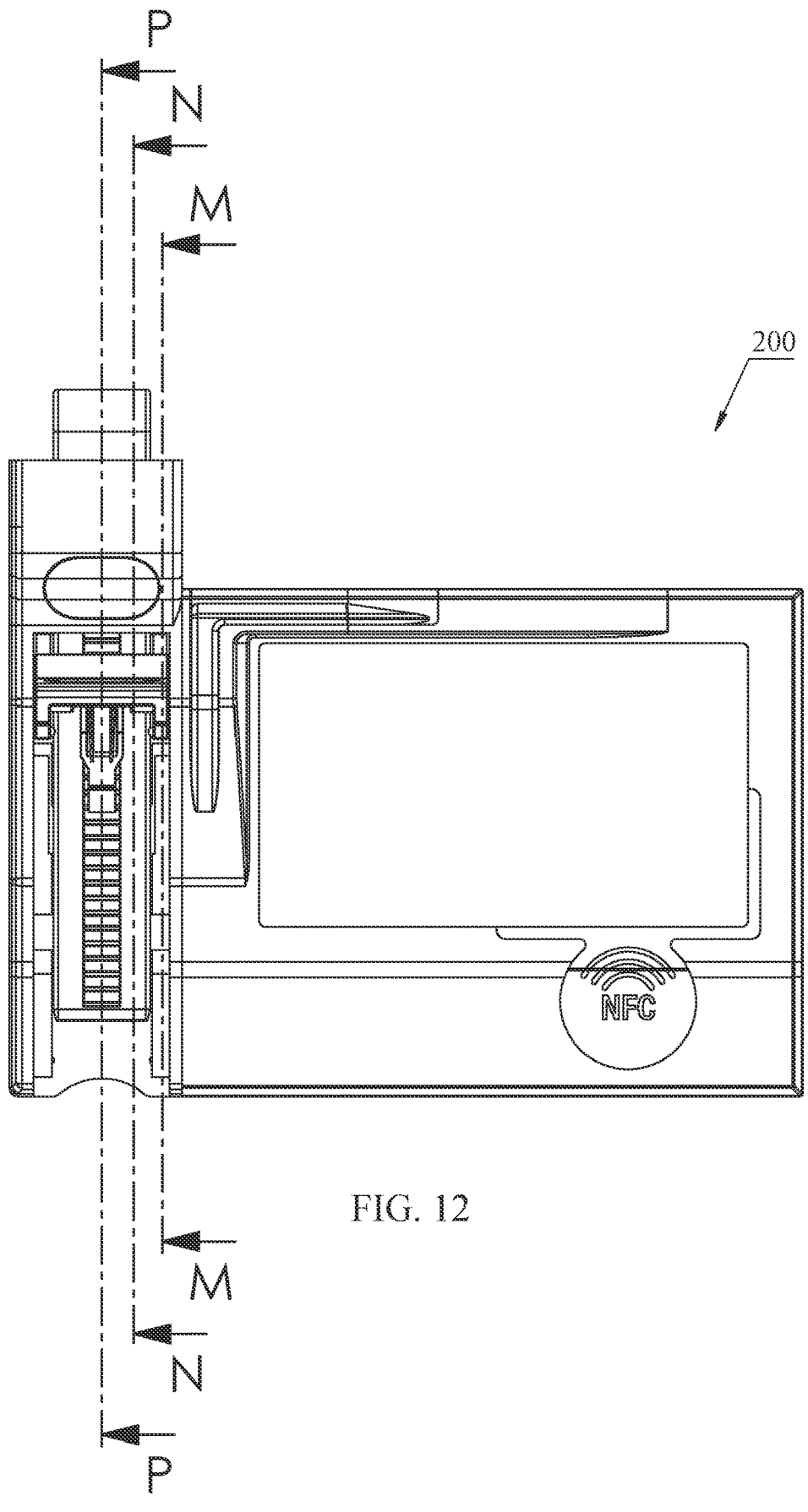
FIGS. 12-17a show other various views of the electronic tag of FIGS. 2-11.

FIG. 12 is a top view of the tag 200 with three cross-section lines M-M, N-N, and P-P, each of which passes through the ratchet latch 212, which is in an open position, approximately at a 90-degree angle, but not in the release position (i.e., in excess of 90 degrees). Cross-section M-M is at an edge of the latch (similar to cross-section F-F of FIG. 8), cross-section N-N is off-center (similar to cross-section G-G of FIG. 8), and cross-section P-P bisects the latch 212 (similar to cross-section H-H of FIG. 8).

Figure 13:
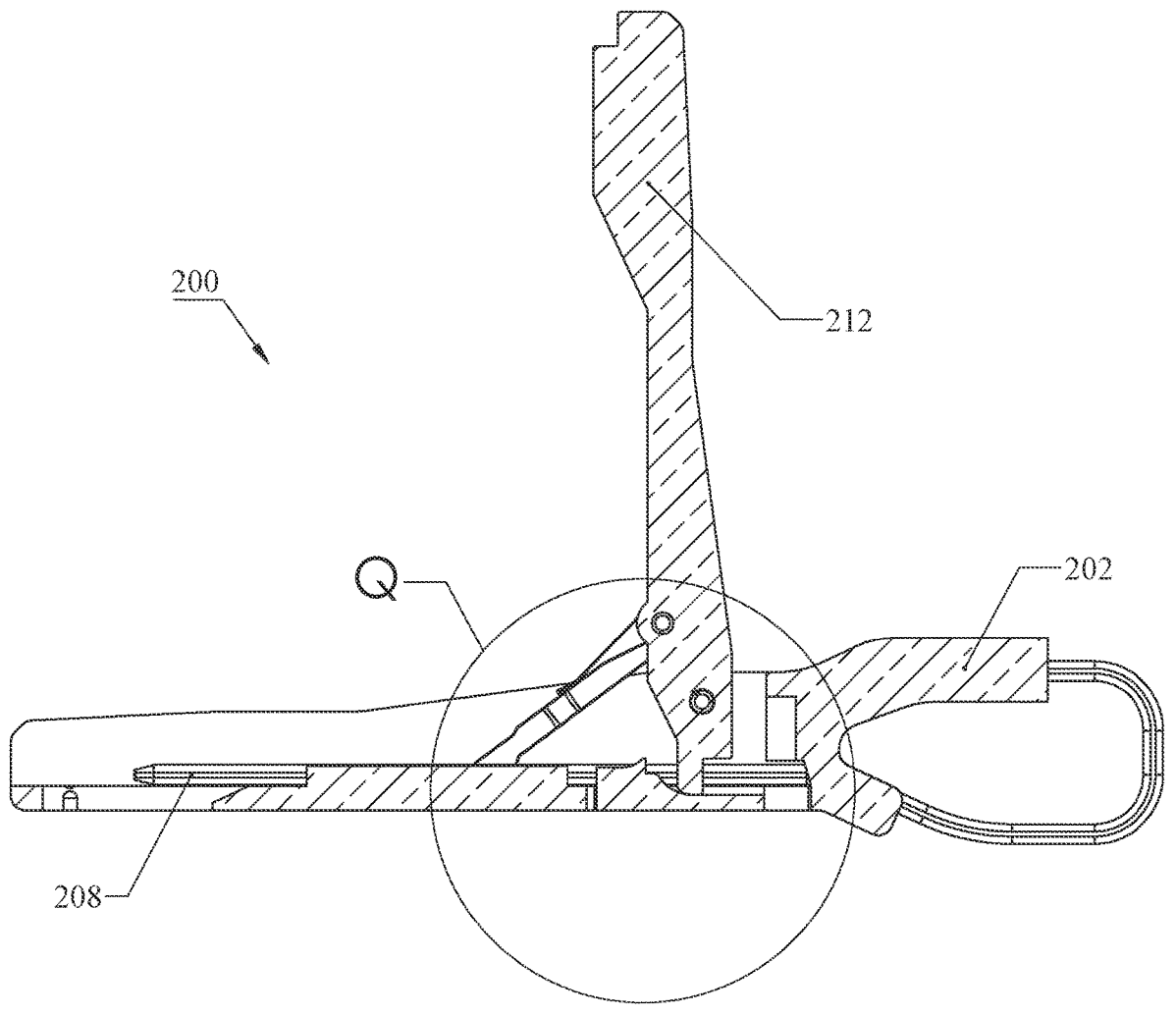
Figure 13A:
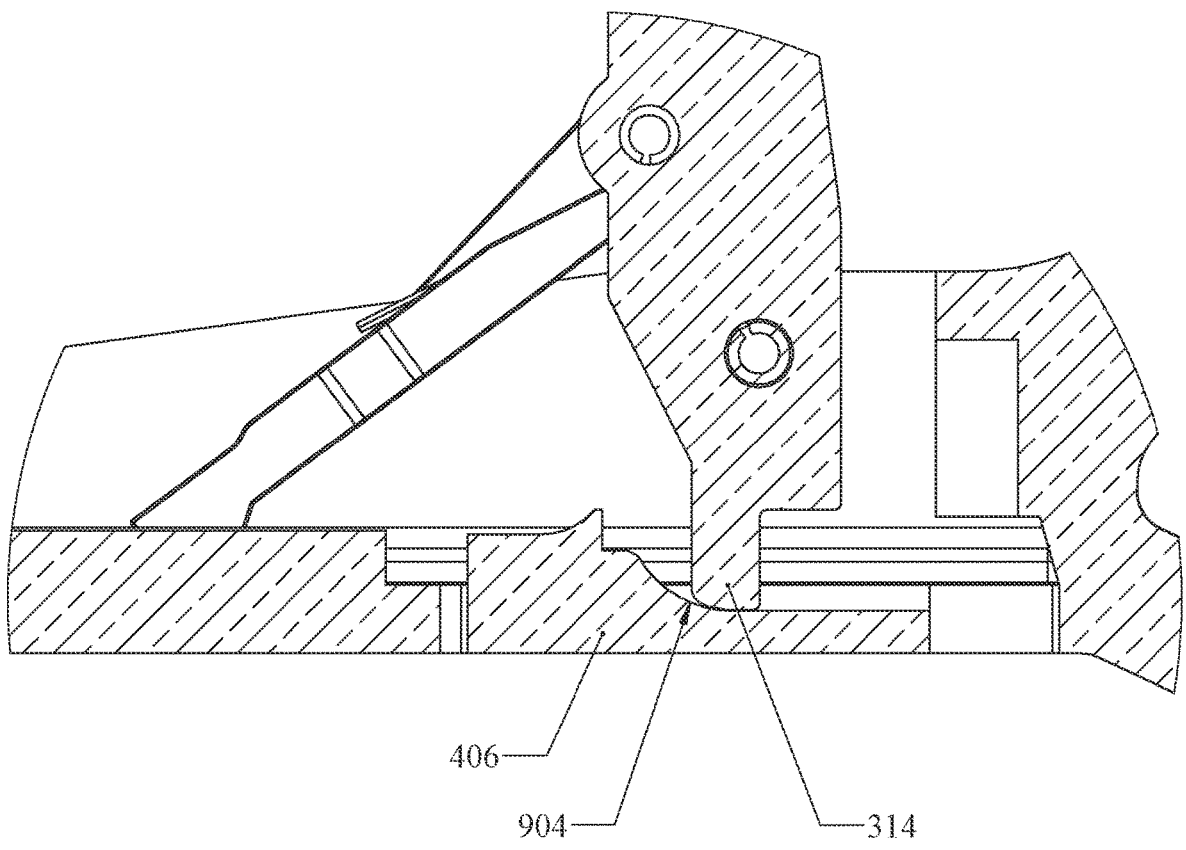

FIG. 13 shows the cross-section M-M of FIG. 12. In the open position shown, the tensioning arm of the ratchet latch 212 is in contact with a topside of the fastening strap 208. FIG. 13A corresponds to the encircled detail Q in FIG. 13, showing that, in this open position, there is no downward deflection of the cantilevered base 406 because the catch release arm(s) 314 of the latch 212 are not in contact with the catch release ramp 904.

Figure 14:
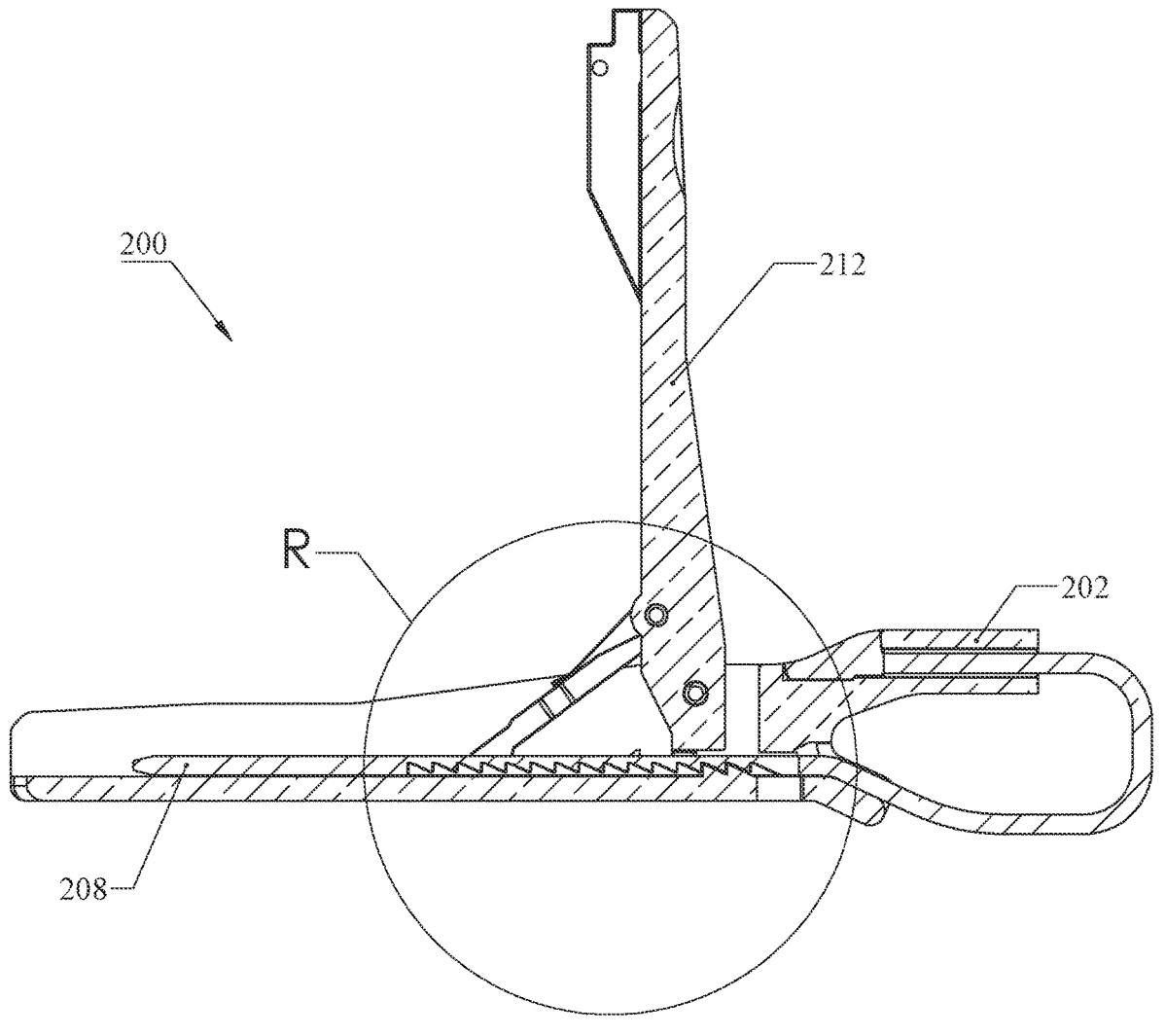
Figure 14A:
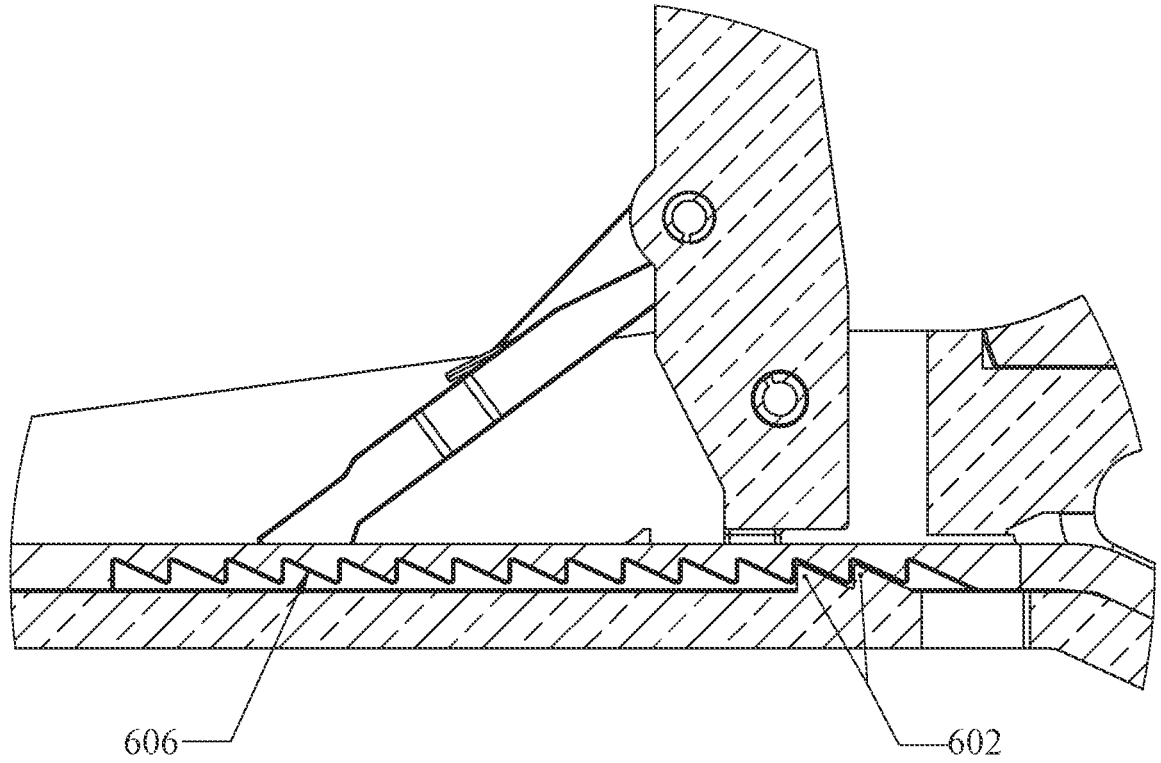

FIG. 14 shows the cross-section N-N of FIG. 12. This cross-section shows the strap 208 and its underside right-triangular notches. FIG. 14A corresponds to the encircled detail R in FIG. 14, showing that when there is no downward deflection of the cantilevered base 406, the catch release tooth 602 is within one of the underside notches 606, thereby preventing the strap from backward movement within the channel of the tag body 202 while the latch is in the open position as shown.

Figure 15:
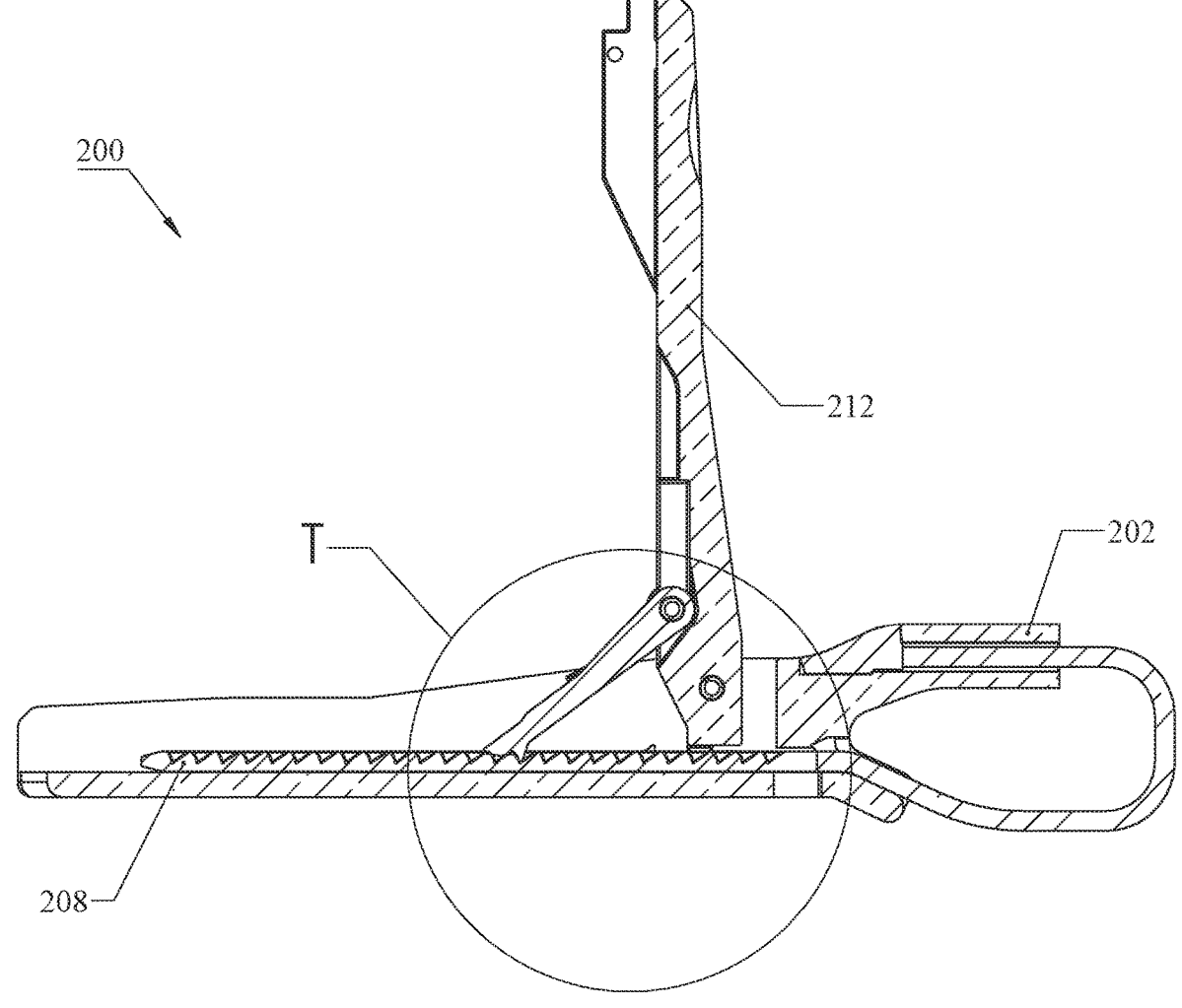
Figure 15A:
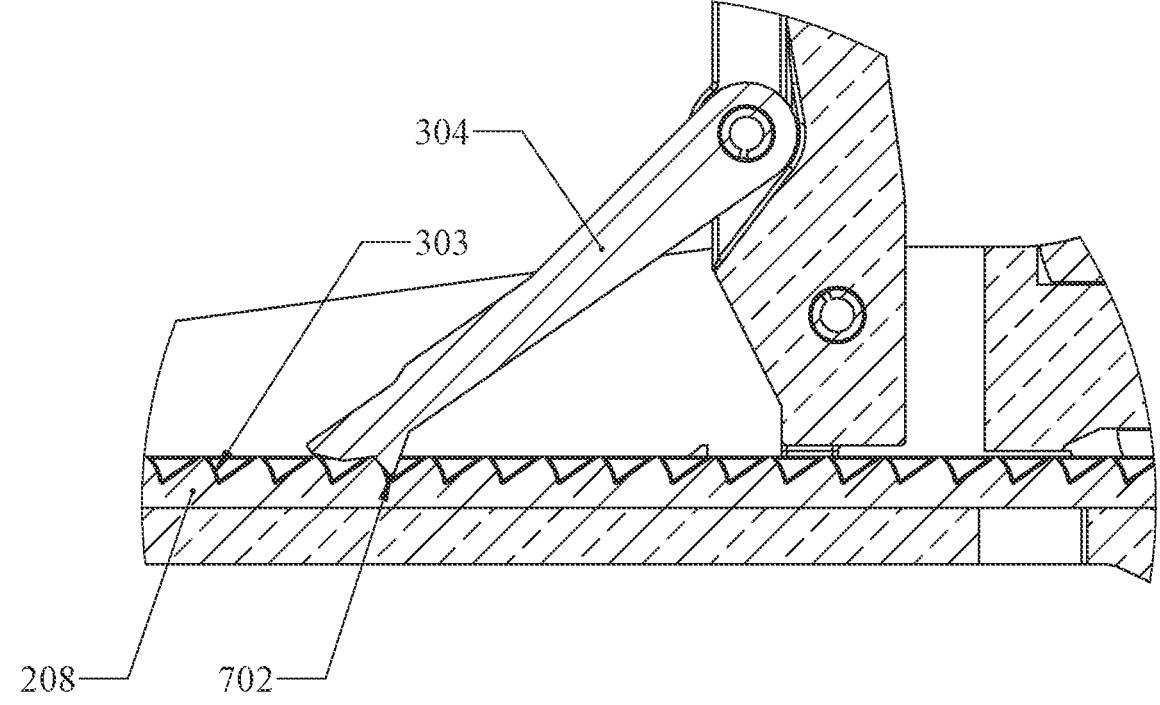

FIG. 15 shows the cross-section Q-Q of FIG. 12. This cross-section shows the strap 208 and its upper rounded notches. FIG. 15A corresponds to the encircled detail T in FIG. 15, showing that when there is no downward deflection of the cantilevered base 406, the tooth 702 at the end of the tensioning arm 304 lies within one of the topside notches 303, while the latch is in the open position as shown. The rounded back surface of the notch 303 ensures that a tooth 702 contacts the notch 303 and pushes perpendicular to the surface to drive the strap further into the tag body when the ratchet latch 212 is lowered.

Figure 16:
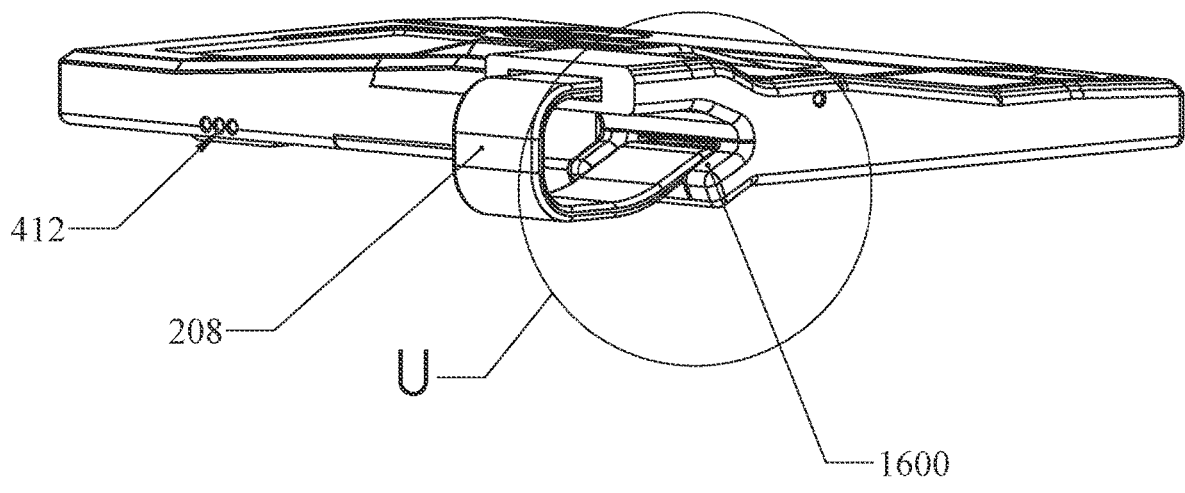
Figure 16A:
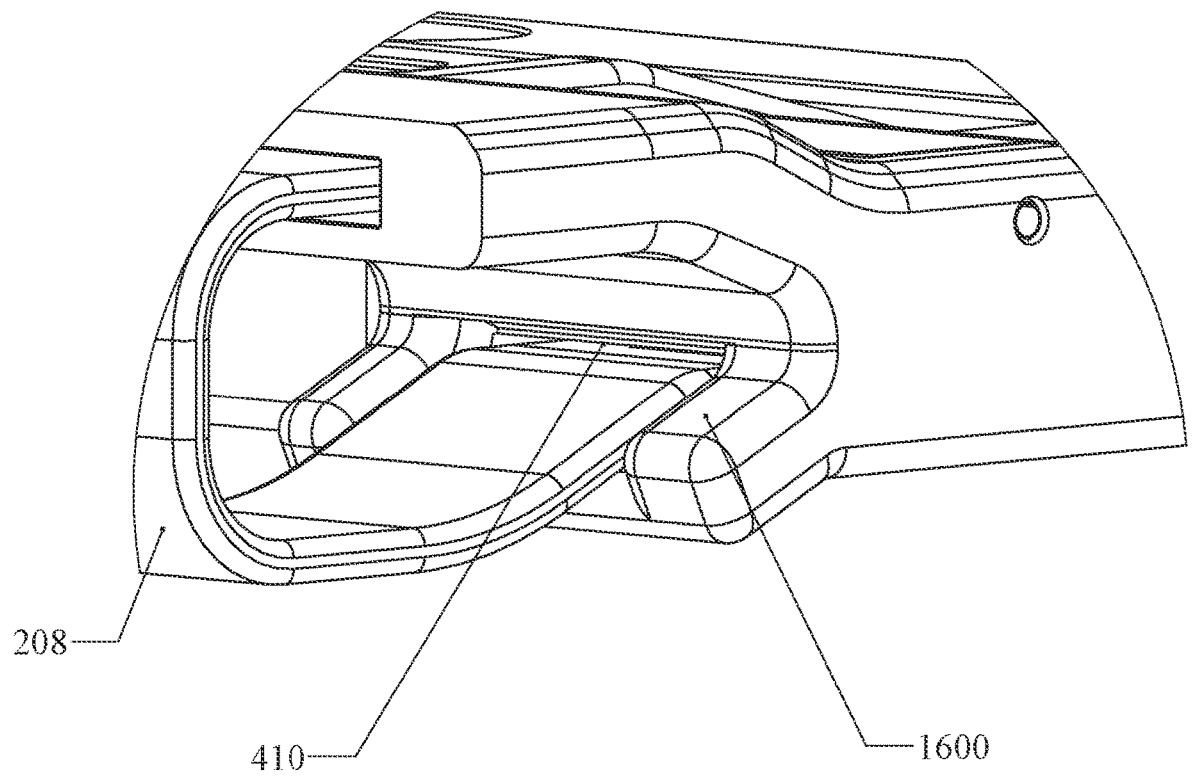

FIG. 16 shows the isometric view of the electronic tag 200 from the side of the fastening strap. FIG. 16A corresponds to the encircled detail U in FIG. 16, showing a strap anti-bind boss 1600 (there is one on each side of the strap). Such bosses 1600 prevent the strap from pinching by a luggage handle when the strap is tightened around it.

Figure 17:
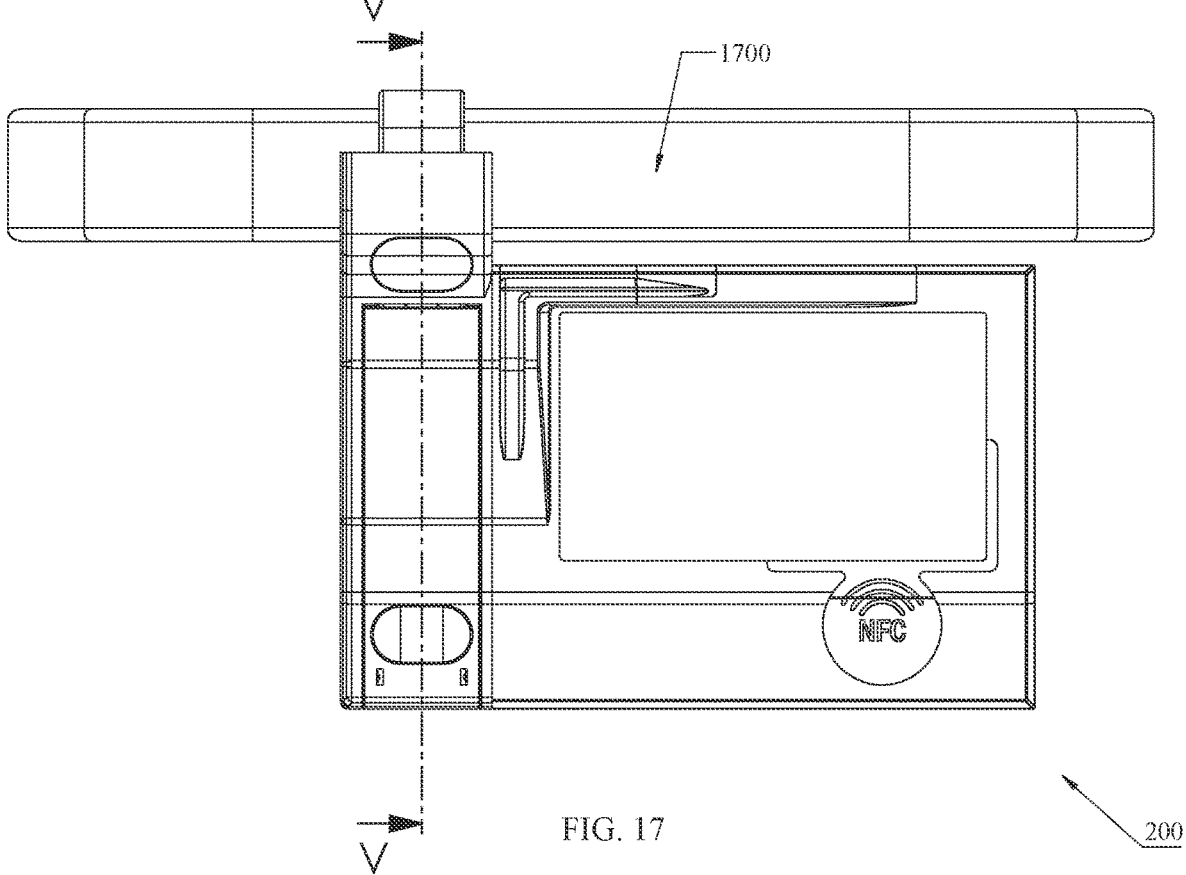

FIG. 17 shows a top view of the electronic tag 200 that is attached to a luggage handle. Although a luggage handle is shown, the tag 200 can be attached to any item or object that has a configuration permitting the strap 208 to be positioned about at least a portion of the item or object, for example, a package, parcel, musical instrument, shelving, ground or aerial vehicle, or any luggage, suitcase, briefcase, satchel, and attaché case.

Figure 17A:
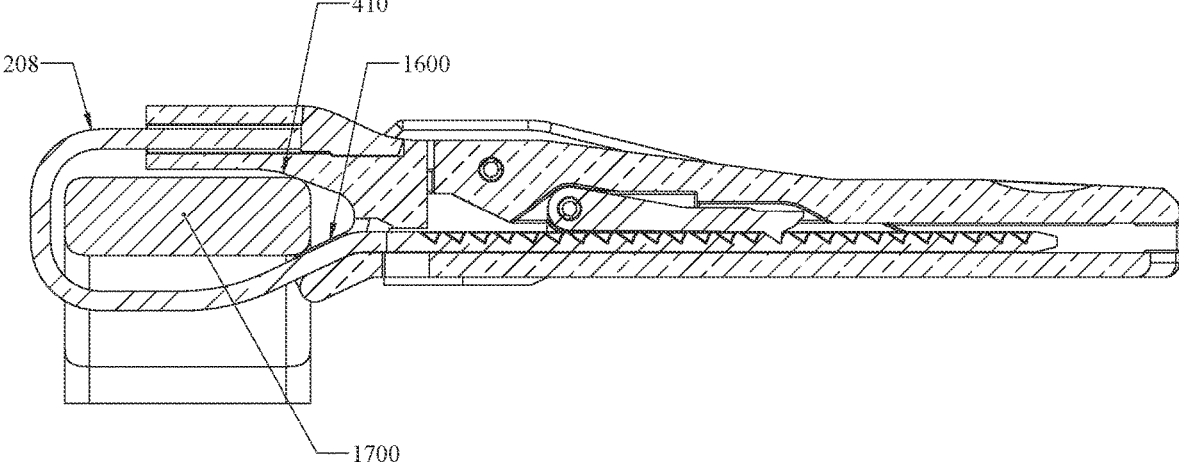

FIG. 17A corresponds to the section view V-V in FIG. 17, showing how the strap anti-bind boss 1600 prevents the luggage handle 1700 from binding the strap after the strap is tightened around it. A bound strap would impede its release and/or additional tightening.

Figure 18:
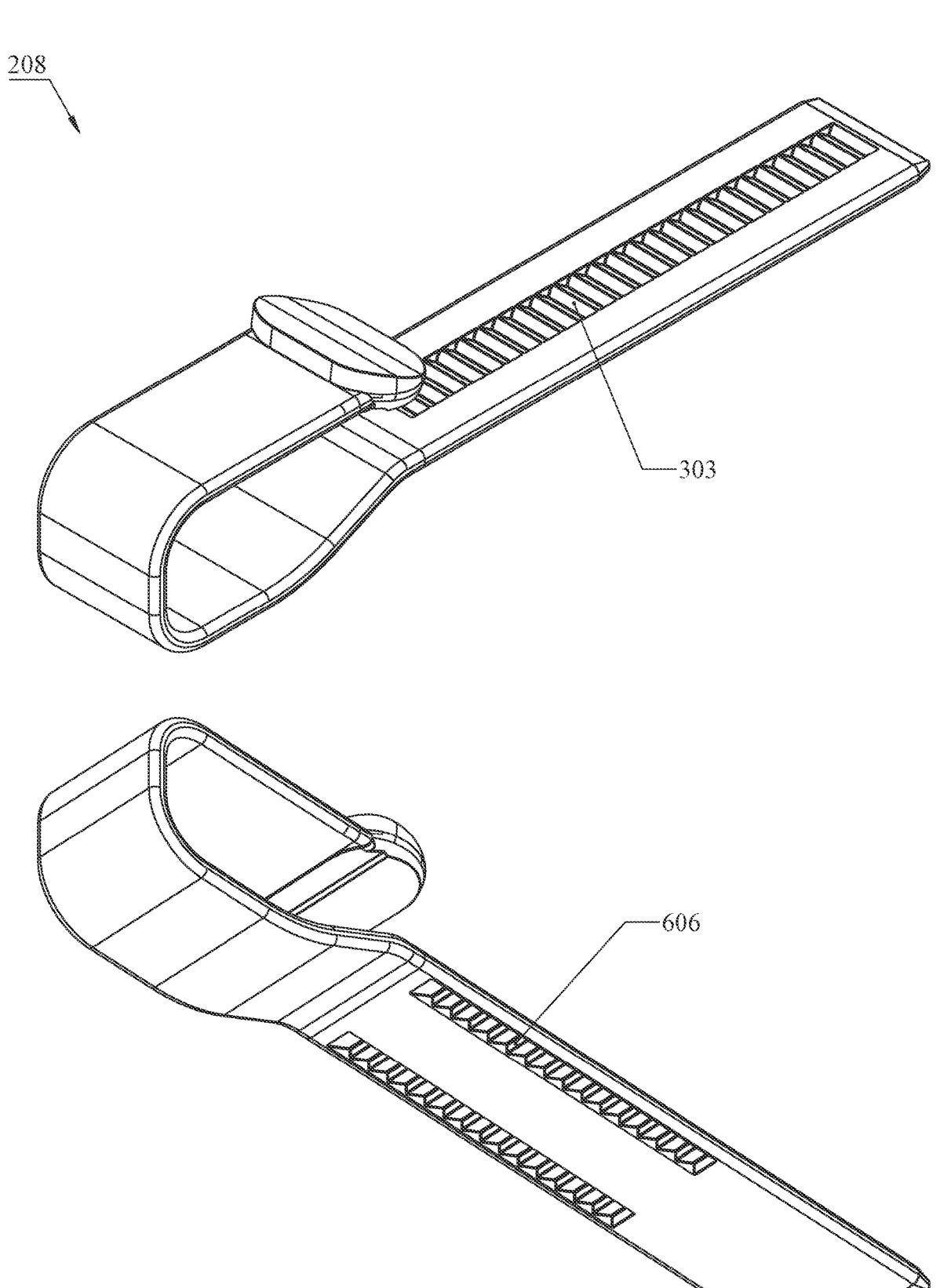
FIG. 18 illustrates two sides of a strap of an electronic tag attachment mechanism, in accordance with some embodiments.

FIG. 18 shows opposite sides of an embodiment of the strap 208. The topside of the strap 208 has a continuous series of notches 303 (each rounded on their rearward side) extending centrally along a length of the strap. The location of this series of notches 303 (i.e., running down the middle of the strap) is in line with the tensioning arm 304 extending from the latch 212. In particular, the tooth 702 at the end of the tensioning arm 304 is aligned to mate with the notches 303 on the topside of the strap 208.

The underside of the strap 208 has two continuous series of notches 606, one near each side edge of the strap. The locations of these two series of notches 606 on opposite side edges of the strap are in line with the two catch release teeth 602 on opposite side edges of the channel 302. In particular, the teeth 602 on the base 406 are aligned to mate with the notches 606 on the underside of the strap 208.

9
10

Figure 19:
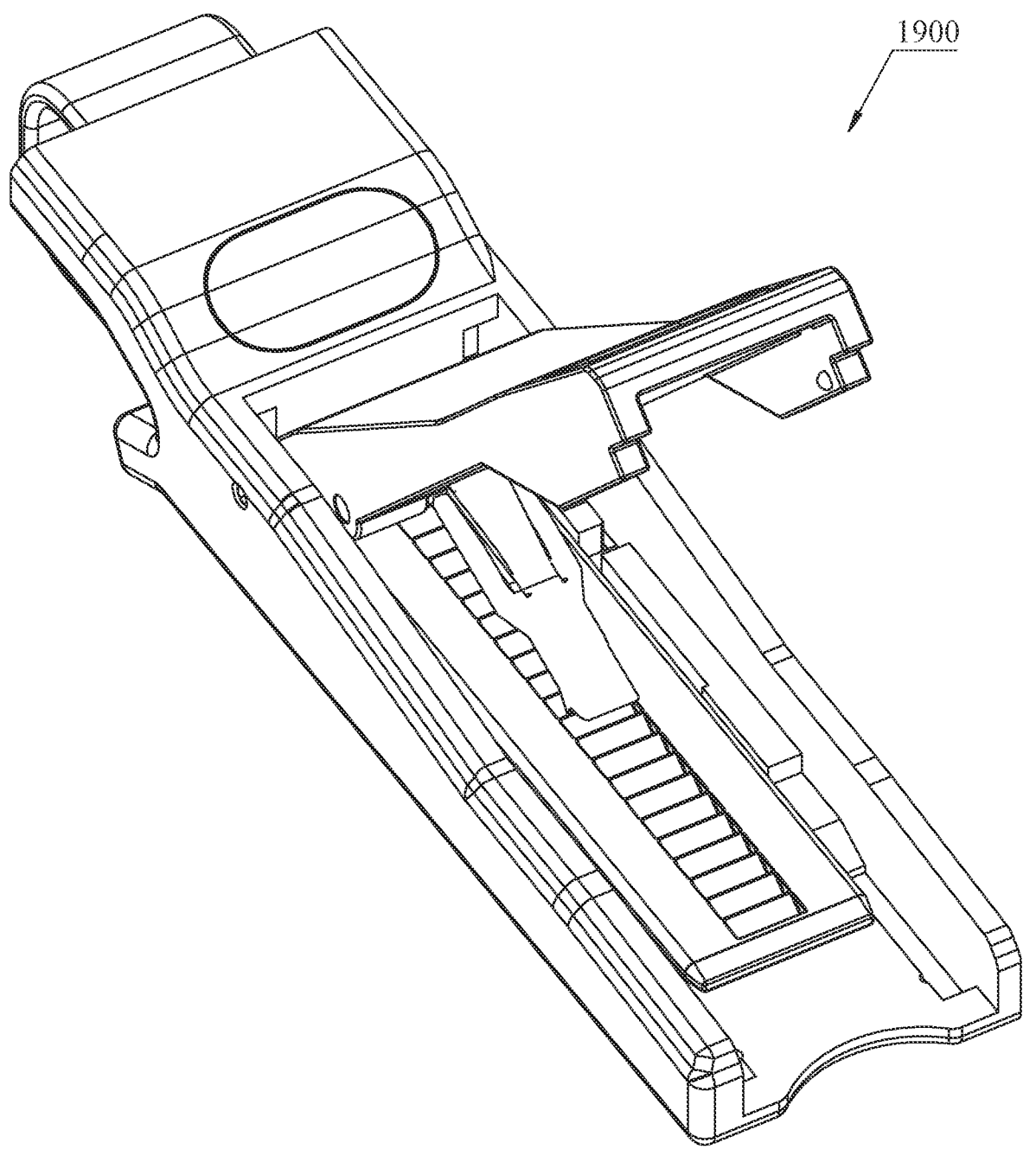
FIG. 19 shows a perspective view of an attachment device, in accordance with other embodiments.

FIG. 19 shows an attachment device 1900, as a standalone apparatus, illustrating that the attachment mechanism 100 described herein does not need to be attached to an electronic tag or integrated into a tag body, but can be used separately, in a variety of applications. The attachment device 1900 may be for the tag 200 in FIGS. 1-18 so details are not repeated for brevity.

Figure 20:
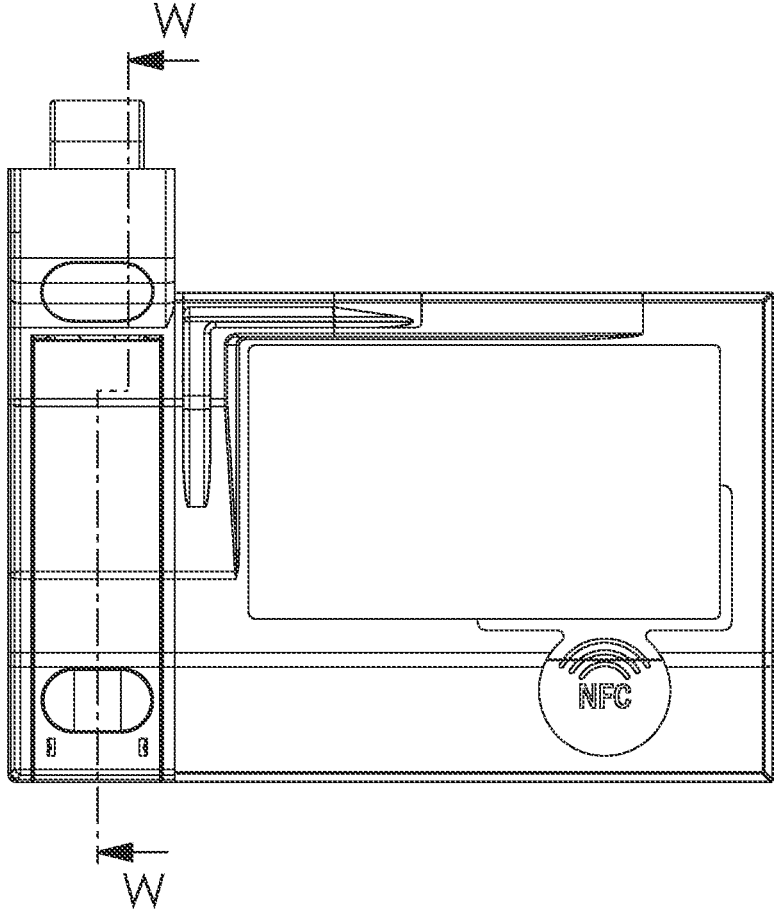
FIGS. 20 and 20a show views of an electronic tag in a closed state.
Figure 20A:
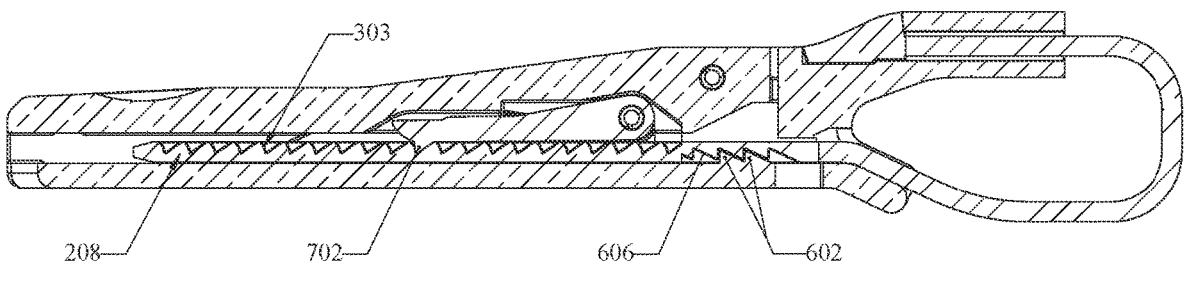

FIG. 20 is a top view of the electronic tag 200 in a closed state. FIG. 20*a* is a section view W-W of FIG. 20. Shown are the bottom of strap 208 interacting with teeth 602 and a top of the strap interaction.

As will be appreciated by one skilled in the art, aspects of the present invention may be embodied as a system, method, and apparatus. Thus, some aspects of the present invention may be embodied entirely in hardware, entirely in software (including, but not limited to, firmware, program code, resident software, microcode), or in a combination of hardware and software.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. References to "one embodiment" or "an embodiment" or "another embodiment" means that a feature, structure or characteristic described in connection with the embodiment is included in at least one embodiment described herein. References to one embodiment within the specification do not necessarily all refer to the same embodiment. The features illustrated or described in connection with one exemplary embodiment may be combined with the features of other embodiments.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all the described terms. Any references to front and back, left and right, top and bottom, upper and lower, and vertical and horizontal, and the like are intended for convenience of description, not to limit the present systems and methods or their components to any one positional or spatial orientation. Accordingly, the foregoing description and drawings are by way of example only, and the scope of the invention should be determined from proper construction of the appended claims, and their equivalents.

What is claimed is:

1. An electronic tag attached to an object to assist a user locate the object, comprising:
a strap;
a body that houses electronic components including a wireless radiofrequency (RF) receiver and a processor that is in communication with the wireless RF receiver, the body having an opening, the opening leading to a channel in the body sized to receive a section of the strap;
a latch extending from the body for clasping the strap, the latch coupled to the body to move between a closed position and an open position; and
a tensioning arm at an underside of the latch, the tensioning arm having a contact surface at a distal end of the latch that engages with notches or protrusions on a top surface of the strap to urge the strap forward into the channel when the latch pivots toward the closed position so that the tensioning arm applies a force to the strap and disengaging from the strap when the latch pivots into the open position, the latch locking the strap in place when in the closed position.

2. The electronic tag of claim 1, further comprising the strap secured at one point to the body, the strap forming a loop when an end of the strap is inserted into the channel of the body and held within the channel by the latch in the closed position.

3. The electronic tag of claim 1, wherein the body has a surface with an electronic display integrated therewith, the electronic display facing outward relative to a loop formed by the strap.

4. The electronic tag of claim 3, wherein the body has a raised shoulder about the display to protect the display in collisions with objects.

5. The electronic tag of claim 4, wherein a top surface of the latch is flush with a surface and follows a contour of the shoulder when the latch is in the closed position.

6. The electronic tag of claim 1, wherein the channel has a cantilevered base with a catch release tooth rising from a surface thereof.

7. The electronic tag of claim 6, wherein the catch release tooth enters a notch or slot in the strap to restrain the strap within the channel as the latch moves toward the open position.

8. The electronic tag of claim 1, wherein the tensioning arm has a tooth at one end that urges the strap forward into the channel as the latch is moved towards the closed position.

9. The electronic tag of claim 1, wherein the underside of the latch has an indent to receive the tensioning arm when the latch is in the closed position.

10. The electronic tag of claim 1, wherein the open position of the latch is greater than ninety degrees.

11. An attachment device for coupling to an item to assist a user to locate the item, the attachment device comprising:
a body that houses electronic components and having an opening therein leading to a channel that is sized to receive a section of a strap, the body having a ratchet latch, the ratchet latch being coupled to the body to move between a closed position in the channel and an open position, an underside of the latch having a tensioning arm attached thereto, the tensioning arm having a contact surface that engages with notches or protrusions on a top surface of the strap to urge the strap forward into the channel when the latch pivots from the open position toward the closed position so that the tensioning arm applies a force to the strap and releasing the strap when the latch pivots into the open position.

12. The attachment device of claim 11, wherein the latch locks the strap in place when in the closed position.

13. The attachment device of claim 12, further comprising a catch release tooth rising from a surface of the channel, the catch release tooth entering a notch on an underside of the strap, to hold the strap from traveling backward within the channel when the latch moves between the closed and open positions.

14. The attachment device of claim 11, further comprising a cantilevered base at a region of the channel.

15. The attachment device of claim 14, further comprising at least one catch release ramp that rises from the cantilevered base, the at least one catch release ramp deflecting the cantilevered base in response to being urged upon by the tensioning arm as the latch is moved into the open position.

16. The attachment device of claim 15, further comprising a catch release stop at a top of each catch release ramp, the catch release stop preventing the latch from opening beyond the open position.

17. The attachment device of claim 11, wherein the tensioning arm has a tooth at one end that urges the strap forward into the channel as the latch is moved towards the closed position.

18. The attachment device of claim 11, wherein an underside of the latch has an indent to receive the tensioning arm when the latch is in the closed position.

19. The attachment device of claim 11, wherein the body has a strap installation stop that secures one end of the strap, the strap forms a loop when an opposite end is in place inside the channel, and the loop tightens as the strap is forwarded into the channel by a ratcheting action of the latch.

20. The attachment device of claim 11, wherein the tensioning arm has a tooth at one end and a surface of the channel has a catch release tooth rising therefrom, and wherein a distance between the tensioning arm tooth and the catch release tooth is a multiple of the spacing or pitch of ratcheting notches on a top side of the strap and catch notches on a bottom side of the strap, to ensure the catch release tooth is in position to capture forward progress of the strap.

* * * * *